US011467668B2

(12) United States Patent
Eagleman et al.

(10) Patent No.: US 11,467,668 B2
(45) Date of Patent: Oct. 11, 2022

(54) SYSTEM AND METHOD FOR REPRESENTING VIRTUAL OBJECT INFORMATION WITH HAPTIC STIMULATION

(71) Applicant: NeoSensory, Inc., Houston, TX (US)

(72) Inventors: David M. Eagleman, Houston, TX (US); Michael Perrotta, Houston, TX (US); Scott Novich, Houston, TX (US)

(73) Assignee: NeoSensory, Inc., Palo Alto, CA (US)

( * ) Notice: Subject to any disclaimer, the term of this patent is extended or adjusted under 35 U.S.C. 154(b) by 0 days.

(21) Appl. No.: 17/076,631

(22) Filed: Oct. 21, 2020

(65) Prior Publication Data

US 2021/0117002 A1 Apr. 22, 2021

Related U.S. Application Data

(60) Provisional application No. 62/972,540, filed on Feb. 10, 2020, provisional application No. 62/924,090, filed on Oct. 21, 2019.

(51) Int. Cl.
*G06F 3/01* (2006.01)

(52) U.S. Cl.
CPC ............. *G06F 3/016* (2013.01); *G06F 3/014* (2013.01)

(58) Field of Classification Search
CPC .......... G05B 2219/40553; G06F 3/016; G06F 3/04886; B60W 50/16; F15B 13/14; H01H 13/85
See application file for complete search history.

(56) References Cited

U.S. PATENT DOCUMENTS

| | | | |
|---|---|---|---|
| 3,342,923 | A | 9/1967 | Henley |
| 4,354,064 | A | 10/1982 | Scott |
| 4,581,491 | A | 4/1986 | Boothroyd |
| 4,665,494 | A | 5/1987 | Tanaka et al. |
| 4,926,879 | A | 5/1990 | Sevrain et al. |
| 5,553,148 | A | 9/1996 | Werle |
| 5,655,271 | A | 8/1997 | Maxwell-Trumble et al. |

(Continued)

FOREIGN PATENT DOCUMENTS

| | | |
|---|---|---|
| WO | 2008106698 A1 | 9/2008 |
| WO | 2012069429 A1 | 5/2012 |

OTHER PUBLICATIONS

Horvath et al., FingerSight: Fingertip Haptic Sensing of the Visual Environment, Mar. 6, 2014, IEEE, vol. 2, 2014 (Year: 2014).

(Continued)

*Primary Examiner* — William Lu
(74) *Attorney, Agent, or Firm* — Jeffrey Schox; Caitlin Ploch

(57) ABSTRACT

A system for haptic stimulation includes a haptic device and preferably interfaces with and/or includes a virtual platform. A method for haptic stimulation includes: receiving a set of inputs; determining one or more parameters associated with a virtual object based on the set of inputs; and prescribing a stimulation pattern to one or more haptic actuators of a haptic device. Additionally or alternatively, the method 200 can include any or all of: presenting information to a user; selecting one or more haptic actuators of a haptic device based on the parameter(s); and/or any other suitable processes performed in any order.

21 Claims, 13 Drawing Sheets

(56) References Cited

U.S. PATENT DOCUMENTS

| | | | |
|---|---|---|---|
| 6,027,463 A | 2/2000 | Moriyasu | |
| 6,155,995 A | 12/2000 | Lin | |
| 6,272,466 B1 | 8/2001 | Harada et al. | |
| 6,295,703 B1 | 10/2001 | Adams et al. | |
| 6,671,618 B2 | 12/2003 | Hoisko | |
| 7,146,218 B2 | 12/2006 | Esteller et al. | |
| 7,222,075 B2 | 5/2007 | Petrushin | |
| 7,232,948 B2 | 6/2007 | Zhang | |
| 7,921,069 B2 | 4/2011 | Canny et al. | |
| 7,979,146 B2 | 7/2011 | Ullrich et al. | |
| 8,005,681 B2 | 8/2011 | Hovestadt et al. | |
| 8,068,025 B2 | 11/2011 | Devenyi et al. | |
| 8,588,464 B2 | 11/2013 | Albertson et al. | |
| 8,754,757 B1 | 6/2014 | Ullrich et al. | |
| 8,952,888 B2 | 2/2015 | Van Den Eerenbeemd et al. | |
| 9,019,087 B2 | 4/2015 | Bakircioglu et al. | |
| 9,298,260 B2 | 3/2016 | Karaoguz et al. | |
| 9,317,116 B2 | 4/2016 | Ullrich et al. | |
| 9,324,320 B1 | 4/2016 | Stolcke et al. | |
| 9,345,433 B1 | 5/2016 | Shinozuka et al. | |
| 9,400,548 B2 * | 7/2016 | Zhang | A63F 13/06 |
| 9,443,410 B1 | 9/2016 | Constien | |
| 9,474,683 B1 | 10/2016 | Mortimer et al. | |
| 9,613,619 B2 | 4/2017 | Lev-Tov et al. | |
| 9,626,845 B2 | 4/2017 | Eagleman et al. | |
| 9,659,384 B2 | 5/2017 | Shaji et al. | |
| 9,714,075 B2 | 7/2017 | Watkins et al. | |
| 9,735,364 B2 | 8/2017 | Cheng et al. | |
| 9,905,090 B2 | 2/2018 | Ullrich et al. | |
| 9,987,962 B1 | 6/2018 | Salter et al. | |
| 11,132,058 B1 * | 9/2021 | Gupta | G06F 3/017 |
| 11,194,386 B1 * | 12/2021 | Zhao | A63F 13/25 |
| 11,216,069 B2 * | 1/2022 | Berenzweig | G06F 3/015 |
| 11,249,550 B2 * | 2/2022 | Won | G09B 9/00 |
| 2002/0111737 A1 | 8/2002 | Hoisko | |
| 2002/0163498 A1 * | 11/2002 | Chang | G06T 11/206 |
| | | | 345/156 |
| 2002/0194002 A1 | 12/2002 | Petrushin | |
| 2003/0025595 A1 | 2/2003 | Langberg | |
| 2003/0067440 A1 | 4/2003 | Rank | |
| 2003/0117371 A1 | 6/2003 | Roberts et al. | |
| 2003/0151597 A1 | 8/2003 | Roberts et al. | |
| 2003/0158587 A1 | 8/2003 | Esteller et al. | |
| 2005/0113167 A1 | 5/2005 | Buchner et al. | |
| 2007/0041600 A1 | 2/2007 | Zachman | |
| 2007/0242040 A1 | 10/2007 | Ullrich et al. | |
| 2008/0120029 A1 | 5/2008 | Zelek et al. | |
| 2008/0140422 A1 | 6/2008 | Hovestadt et al. | |
| 2008/0170118 A1 | 7/2008 | Albertson et al. | |
| 2009/0006363 A1 | 1/2009 | Canny et al. | |
| 2009/0012638 A1 | 1/2009 | Lou | |
| 2009/0096632 A1 | 4/2009 | Ullrich et al. | |
| 2010/0249637 A1 | 9/2010 | Walter et al. | |
| 2010/0302033 A1 | 12/2010 | Devenyi et al. | |
| 2011/0061017 A1 | 3/2011 | Ullrich et al. | |
| 2011/0063208 A1 | 3/2011 | Van et al. | |
| 2011/0173574 A1 * | 7/2011 | Clavin | G06F 3/017 |
| | | | 715/863 |
| 2011/0202155 A1 | 8/2011 | Ullrich et al. | |
| 2011/0202337 A1 | 8/2011 | Fuchs et al. | |
| 2011/0221694 A1 | 9/2011 | Karaoguz et al. | |
| 2011/0319796 A1 | 12/2011 | Campdera | |
| 2012/0023785 A1 | 2/2012 | Barnes et al. | |
| 2012/0065714 A1 * | 3/2012 | Szasz | A61B 18/1206 |
| | | | 607/101 |
| 2013/0102937 A1 | 4/2013 | Ehrenreich et al. | |
| 2013/0116852 A1 * | 5/2013 | Dijk | G06F 3/011 |
| | | | 700/301 |
| 2013/0218456 A1 | 8/2013 | Zelek et al. | |
| 2013/0265286 A1 | 10/2013 | Da Costa et al. | |
| 2014/0055352 A1 * | 2/2014 | Davis | G06F 3/0304 |
| | | | 345/156 |
| 2014/0064516 A1 | 3/2014 | Cruz-Hernandez et al. | |
| 2014/0363138 A1 | 12/2014 | Coviello et al. | |
| 2015/0025895 A1 | 1/2015 | Schildbach | |
| 2015/0038887 A1 | 2/2015 | Piccirillo | |
| 2015/0070150 A1 | 3/2015 | Levesque et al. | |
| 2015/0120289 A1 | 4/2015 | Lev-Tov et al. | |
| 2015/0161994 A1 | 6/2015 | Tang et al. | |
| 2015/0161995 A1 | 6/2015 | Sainath et al. | |
| 2015/0227204 A1 | 8/2015 | Gipson et al. | |
| 2015/0230524 A1 | 8/2015 | Stevens et al. | |
| 2015/0272815 A1 | 10/2015 | Kitchens | |
| 2015/0294597 A1 * | 10/2015 | Rizzo | G08B 6/00 |
| | | | 340/4.12 |
| 2015/0305974 A1 | 10/2015 | Ehrenreich et al. | |
| 2015/0351999 A1 | 12/2015 | Brouse | |
| 2015/0356889 A1 * | 12/2015 | Schwartz | G09B 21/009 |
| | | | 340/4.12 |
| 2016/0012688 A1 * | 1/2016 | Eagleman | G09B 21/009 |
| | | | 340/407.1 |
| 2016/0021511 A1 * | 1/2016 | Jin | H04W 4/02 |
| | | | 455/457 |
| 2016/0026253 A1 | 1/2016 | Bradski et al. | |
| 2016/0027338 A1 | 1/2016 | Ebeling et al. | |
| 2016/0049915 A1 | 2/2016 | Wang et al. | |
| 2016/0098844 A1 | 4/2016 | Shaji et al. | |
| 2016/0098987 A1 | 4/2016 | Stolcke et al. | |
| 2016/0103590 A1 | 4/2016 | Vu et al. | |
| 2016/0179198 A1 * | 6/2016 | Levesque | G06F 1/163 |
| | | | 340/407.1 |
| 2016/0179199 A1 * | 6/2016 | Levesque | G06F 3/014 |
| | | | 340/407.2 |
| 2016/0187987 A1 | 6/2016 | Ullrich et al. | |
| 2016/0254454 A1 | 9/2016 | Cheng et al. | |
| 2016/0255944 A1 | 9/2016 | Baranski et al. | |
| 2016/0274662 A1 * | 9/2016 | Rimon | G06F 3/016 |
| 2016/0284189 A1 | 9/2016 | Constien | |
| 2016/0292856 A1 | 10/2016 | Niemeijer et al. | |
| 2016/0297611 A1 | 10/2016 | Williams et al. | |
| 2016/0313801 A1 * | 10/2016 | Wagner | G09B 21/02 |
| 2016/0358429 A1 | 12/2016 | Ullrich et al. | |
| 2016/0367190 A1 | 12/2016 | Vaitaitis | |
| 2017/0131775 A1 * | 5/2017 | Clements | A63F 13/285 |
| 2017/0169673 A1 | 6/2017 | Billington et al. | |
| 2017/0206889 A1 | 7/2017 | Lev-Tov et al. | |
| 2017/0213568 A1 | 7/2017 | Foshee | |
| 2017/0290736 A1 | 10/2017 | Idris | |
| 2017/0294086 A1 * | 10/2017 | Kerdemelidis | G08B 6/00 |
| 2017/0348184 A1 | 12/2017 | Pisharodi et al. | |
| 2018/0039333 A1 * | 2/2018 | Carter | G06F 3/16 |
| 2018/0284894 A1 * | 10/2018 | Raut | G02B 27/017 |
| 2018/0356893 A1 * | 12/2018 | Soni | G06F 3/0346 |
| 2018/0374264 A1 | 12/2018 | Gatson et al. | |
| 2019/0171291 A1 * | 6/2019 | Domenikos | G06F 3/0416 |
| 2019/0235628 A1 * | 8/2019 | Lacroix | G06F 3/01 |
| 2019/0302887 A1 * | 10/2019 | Sinclair | G06F 3/016 |
| 2019/0337451 A1 | 11/2019 | Bacchus et al. | |
| 2019/0384397 A1 * | 12/2019 | Cruz-Hernandez | G06F 3/016 |
| 2020/0093679 A1 * | 3/2020 | Sonar | G01L 1/205 |
| 2020/0122403 A1 * | 4/2020 | Dhokia | G06F 30/17 |
| 2020/0211220 A1 * | 7/2020 | Ilic | G06T 7/74 |
| 2020/0394826 A1 * | 12/2020 | Ma | G06T 7/277 |

OTHER PUBLICATIONS

Jones et al., Development of a Tactile Vest, 2004, IEEE, 0-7695-2112-6/04 (Year: 2004).

Nakamura et al., An Actuator for the Tactile Vest—a Torso-Based Haptic Device, 2003, IEEE, 0-7695-1890-7/03 (Year 2003).

Paneels et al., What's Around Me? Multi-Actuator Haptic Feedback on the Wrist, Apr. 14-18, 2013, IEEE, 978-1-4799-0088-6/13, pp. 407-412 (Year: 2013).

Tapson et al., The Feeling of Color: A Haptic Feedback Device for the Visually Disabled, 2008, IEEE, 978-1-4244-2879-3/08, pp. 381-384 (Year: 2008).

(56) References Cited

OTHER PUBLICATIONS

"PLANT, Geoff, "Training in the use of the Tactaid VII: A case study", KTH Computer Science and Communication (STL-QPSR), 1994, vol. 35, No. 1, pp. 091-102.", 2017-07-24 00:00:00.0.

* cited by examiner

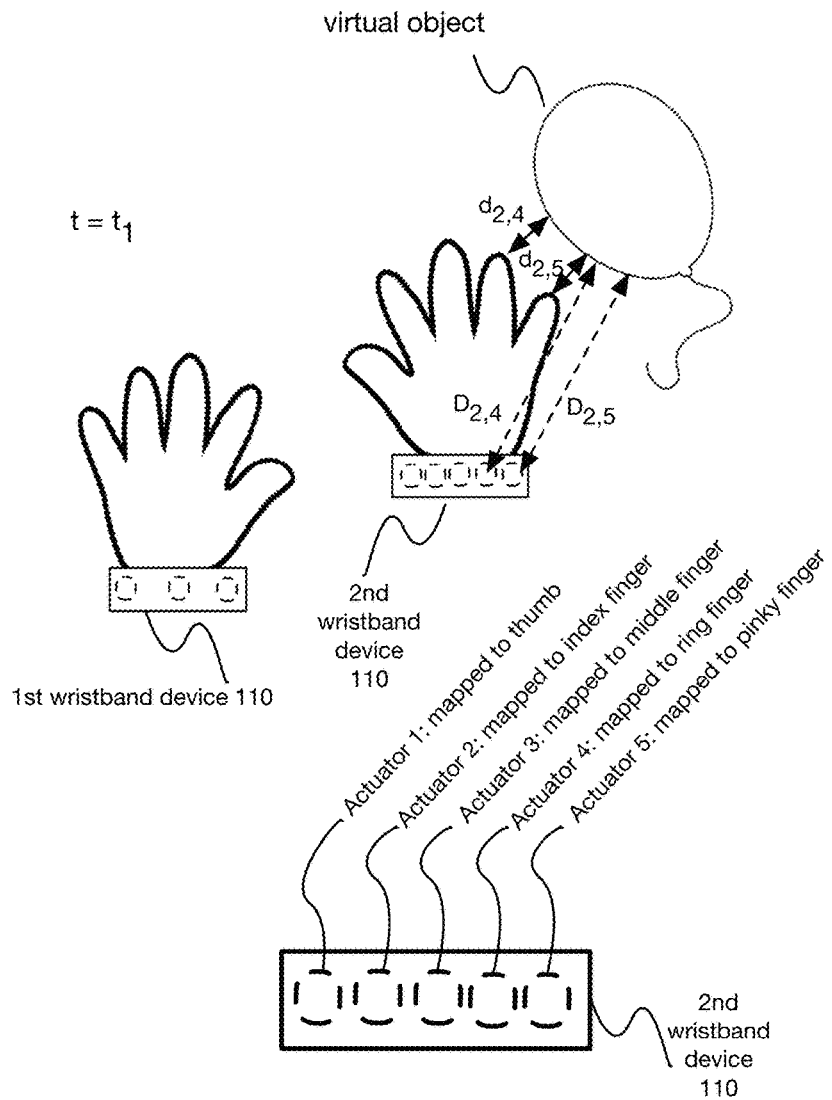

1st embodiment (mapping to fingers): Distances $d_{2,4}$ and $d_{2,5}$ within a predetermined distance threshold —> actuate Actuators 4 and 5 of 2nd device (e.g., with the same stimulation patterns, with different stimulation patterns, with an intensity corresponding to the distance, etc.)

2nd embodiment: Distances $D_{2,4}$ and $D_{2,5}$ within a predetermined distance threshold —> actuate Actuators 4 and 5 of 2nd device (e.g., with the same stimulation patterns, with different stimulation patterns, with an intensity corresponding to the distance, etc.)

FIGURE 4A

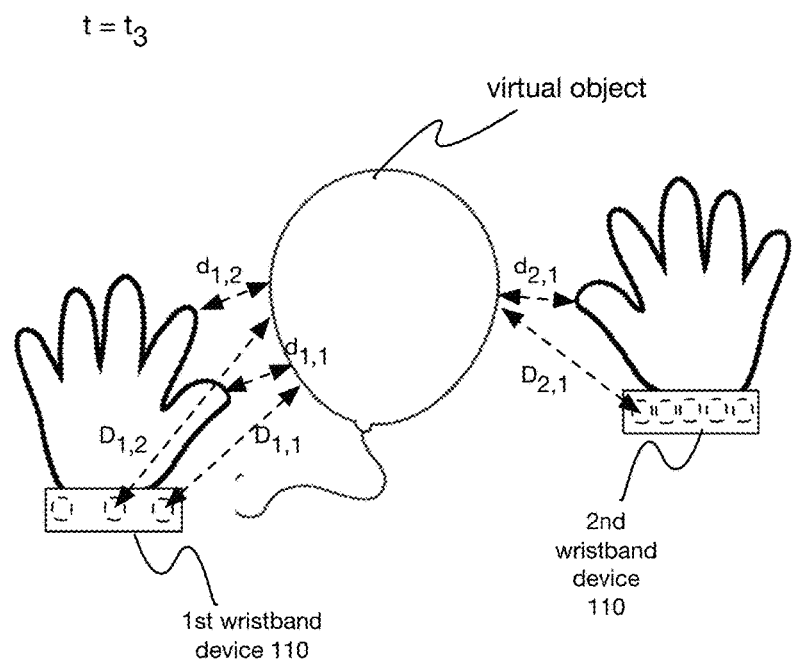

1st embodiment (mapping to fingers): Distances $d_{1,1}$, $d_{1,2}$, $d_{2,1}$, within a predetermined distance threshold --> actuate Actuators 1 and 2 of 1st device (e.g., with a predetermined stimulation pattern, with a stimulation pattern determined based on the value of the distance, etc.) and Actuator 1 of 2nd device (e.g., with a predetermined stimulation pattern, with a stimulation pattern determined based on the value of the distance, with the same stimulation pattern as on 1st device, etc.)

2nd embodiment : Distances $D_{1,1}$, $D_{1,2}$, $D_{2,1}$, within a predetermined distance threshold --> actuate Actuators 1 and 2 of 1st device (e.g., with a predetermined stimulation pattern, with a stimulation pattern determined based on the value of the distance, etc.) and Actuator 1 of 2nd device (e.g., with a predetermined stimulation pattern, with a stimulation pattern determined based on the value of the distance, with the same stimulation pattern as on 1st device, etc.)

FIGURE 4C

SYSTEM AND METHOD FOR REPRESENTING VIRTUAL OBJECT INFORMATION WITH HAPTIC STIMULATION

CROSS-REFERENCE TO RELATED APPLICATIONS

This application claims the benefit of U.S. Provisional Application No. 62/924,090, filed 21 Oct. 2019, and U.S. Provisional Application No. 62/972,540, filed 10 Feb. 2020, each of which is incorporated herein in its entirety by this reference.

TECHNICAL FIELD

This invention relates generally to the sensory output field, and more specifically to a new and useful system and method for representing virtual object information in the sensory output field.

BACKGROUND

Haptic stimulation (equivalently referred to herein as tactile stimulation) has been shown to have several advantages in various sensory use cases, such as: supplementing other forms of sensory inputs (e.g., audio, visual, etc.) in enhancing a user experience; replacing sensory inputs which might be compromised and/or otherwise unable to be perceived (e.g., audio for hearing-impaired individuals, visual media for visually-impaired individuals, etc.); and/or otherwise enhancing user perception and conveying information.

Virtual platforms, such as virtual reality and/or augmented reality platforms (e.g., for gaming, training, remote task performance, etc.) have begun to integrate haptic technologies, such as through the use of haptic gloves which attempt to mimic how objects would directly feel on the hands of users. These gloves and/or other current systems, however, are conventionally very bulky, wired, and/or otherwise cumbersome to use.

The inventors have discovered a new and useful system and method to represent information associated with virtual objects through tactile stimulation.

BRIEF DESCRIPTION OF THE FIGURES

FIGS. 4A-4C depict a variation of a user's interaction with a virtual object and example embodiments of the stimulation patterns applied based on the interactions.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview

Figure 1:
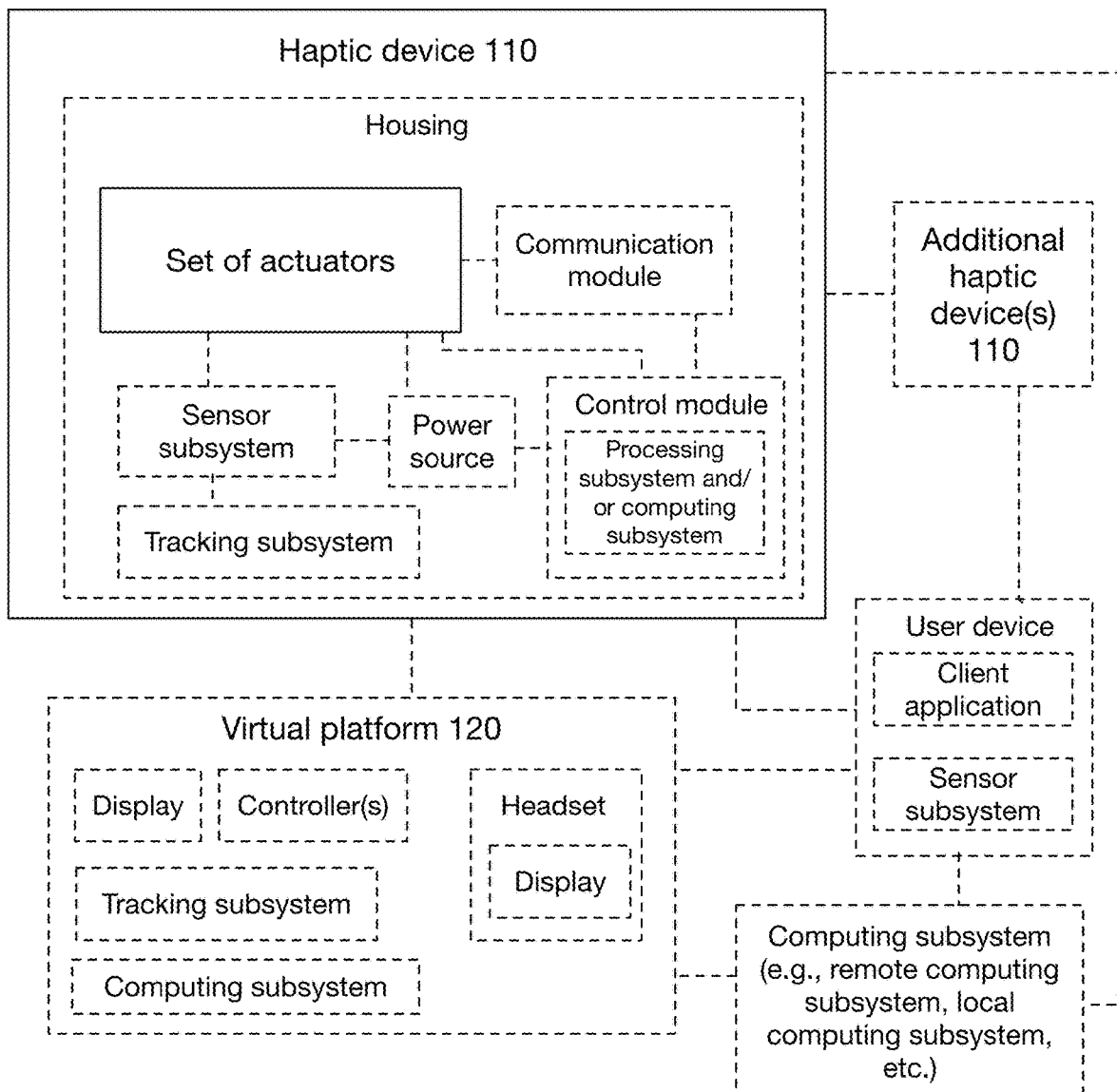
FIG. 1 is a schematic representation of the system 100 for representing virtual object information with haptic stimulation.

As shown in FIG. 1, a system 100 for haptic stimulation includes a haptic device 110 and preferably interfaces with and/or includes a virtual platform 120. Additionally or alternatively, the system 100 can include, define, and/or interface with any or all of: a processing subsystem, control module, communication subsystem, user device, and/or any other suitable component(s). Further additionally or alternatively, the system 100 can include any or all of the systems, component, embodiments, and/or examples described in any or all of: U.S. application Ser. No. 14/750,626, filed 25 Jun. 2015, U.S. application Ser. No. 15/661,934, filed 27 Jul. 2017, U.S. application Ser. No. 15/795,054, filed 26 Oct. 2017, and U.S. application Ser. No. 17/033,433, filed 25 Sep. 2020, each of which is incorporated herein in its entirety by this reference.

Figure 2:
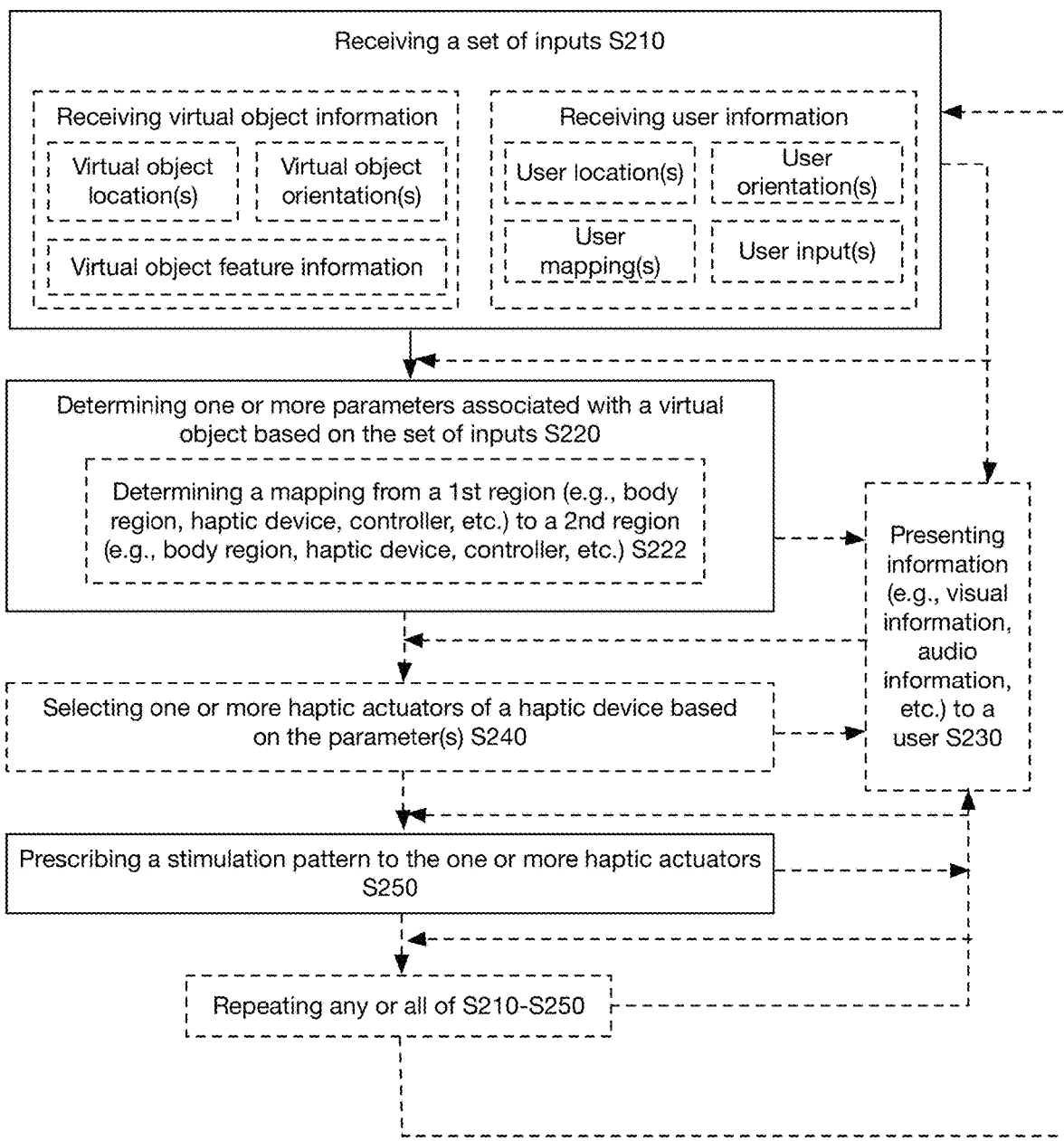
FIG. 2 is a schematic representation of the method 200 for representing virtual object information with haptic stimulation.
Figure 3A:
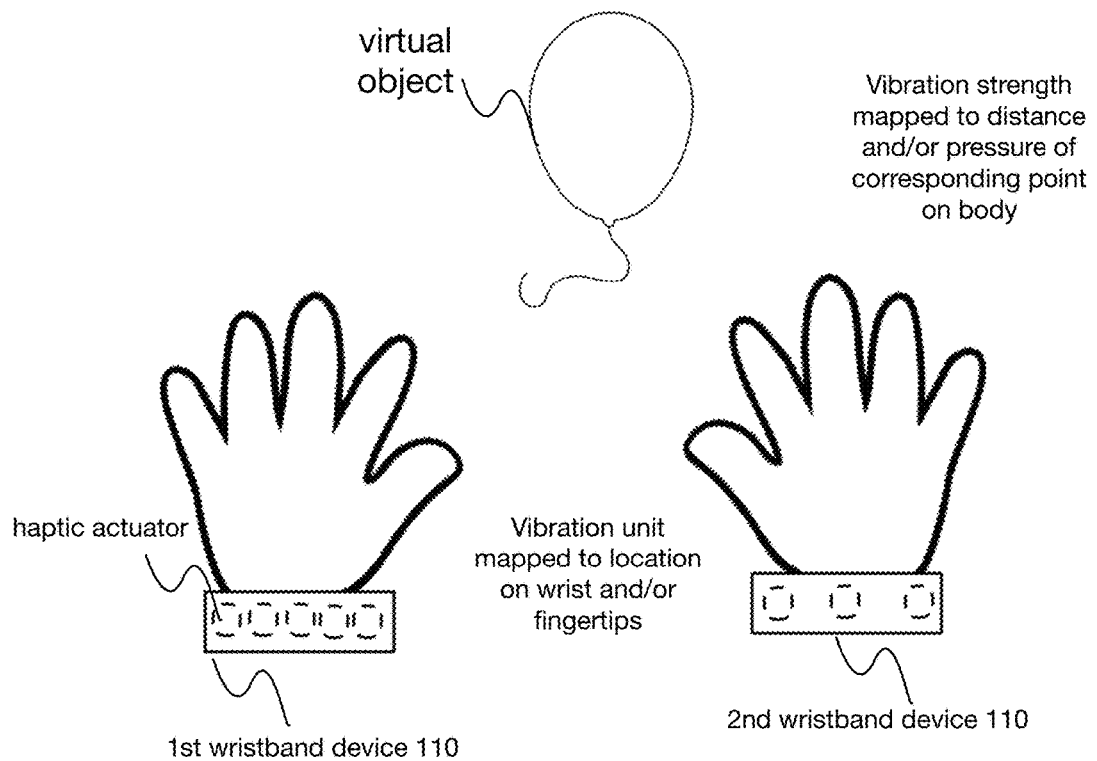
FIGS. 3A-3B depict a schematic representation of a user's hands relative to a virtual object (virtual balloon) and a variation of wristband haptic devices.
Figure 3B:
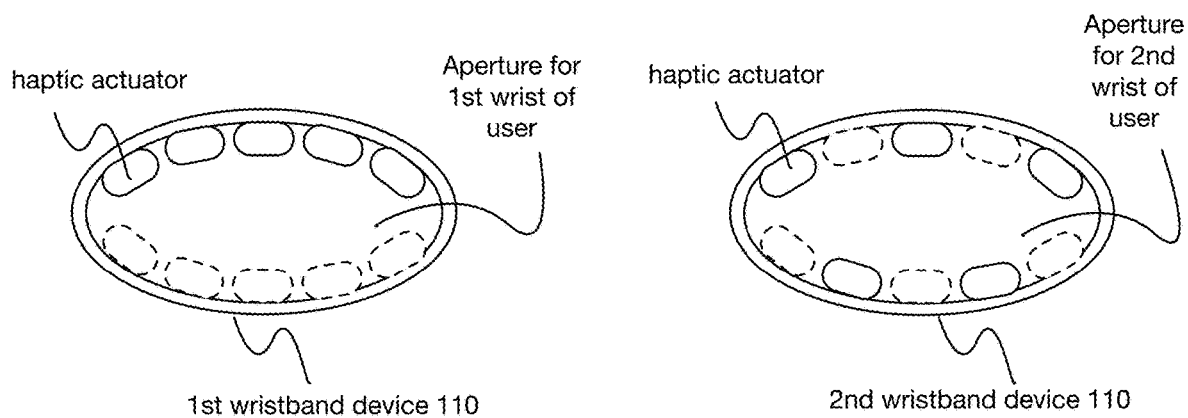

As shown in FIG. 2, a method 200 for haptic stimulation includes: receiving a set of inputs S210; determining one or more parameters associated with a virtual object based on the set of inputs S220; and prescribing a stimulation pattern to one or more haptic actuators of a haptic device S250. Additionally or alternatively, the method 200 can include any or all of: presenting information to a user S230; selecting one or more haptic actuators of a haptic device based on the parameter(s) S240; repeating any or all of S210-S2150; and/or any other suitable processes performed in any suitable order. Further additionally or alternatively, the method 200 can include any or all of the methods, processes, embodiments, and/or examples described in any or all of: U.S. application Ser. No. 14/750,626, filed 25 Jun. 2015, U.S. application Ser. No. 15/661,934, filed 27 Jul. 2017, U.S. application Ser. No. 15/795,054, filed 26 Oct. 2017, and U.S. application Ser. No. 17/033,433, filed 25 Sep. 2020, each of which is incorporated herein in its entirety by this reference.

The method 200 is preferably performed with a system 100 as described below, but can additionally or alternatively be performed with any suitable system or systems.

2. Benefits

The system and method for haptic stimulation can confer several benefits over current systems and methods.

First, in some variations, the system and/or method confers the benefit of conveying information for the control (e.g., fine-grained control) and manipulation of virtual objects in a virtual reality and/or augmented reality platform. Additionally or alternatively, the system and/or method can enable any or all of: conveying information to the user associated with the location of a virtual object outside of the field-of-view of the user (e.g., behind the user); conveying information associated with phenomena not perceivable by a user (e.g., echolocation), herein equivalently referred to as sensory addition; supplementing conventional sensory experiences with haptic stimulation (e.g., to enhance a gaming experience, to enhance a virtual teleconference experience, to enhance a virtual concert experience, etc.); and/or convey any other suitable information to a user and/or otherwise enhance a experience.

Second, in some variations additional or alternative to those described above, the system and/or method confers the benefit of utilizing and/or creating a sensory displacement experience to efficiently and uniquely convey haptic information to the user. Sensory displacement can be enabled in the method 200, for instance, by receiving the haptic stimulation at a different body part and/or body region than where it appears visually in a virtual platform. In one set of variations, for instance, a haptic device placed on the wrist provides haptic stimulation at the user's wrist which represents the interaction of a user's fingers with a virtual object. This can in turn function to enable the haptic device to be less cumbersome (e.g., smaller, placed on a more desirable and/or sensitive body region, placed on a less conspicuous body region, wireless, etc.), maximize mobility and/or dexterity of the user such as at the body region visually portrayed to be interacting with the virtual object (e.g., the user's fingers), and/or can confer any other suitable functions. In specific examples, a haptic device placed on the wrist is used to convey haptic stimulation to the user's wrist which represents the interaction of the user's fingers with one or more virtual objects, wherein the stimulation at the wrist is learned by the user (e.g., naturally, through training, etc.) to represent interactions of the user's fingers with a virtual object as detectable visually by the user. This can be used in gaming, surgical training (e.g., by enabling the user to maintain full hand mobility and dexterity), remote task performance (e.g., remote surgeries, remote robot control, etc.), and/or any other suitable tasks.

Third, in some variations, additional or alternative to those described above, the system and/or method confers the benefit of enabling haptic stimulation to be applied to represent various different types and/or potential features of virtual objects, such as, but not limited to, any or all of: a virtual object's location relative to the user, a temperature, a texture, a pressure, a force, a discrete state (e.g., within or outside of a particular threshold, alive or dead, hot or cold, safe or in danger, close or far, etc.), and/or any other suitable features. In specific examples, the stimulation pattern associated with different features (e.g., proximity vs. temperature) can be altered (e.g., in frequency, in amplitude, in a stimulation pulse pattern, etc.) to help the user distinguish between different types of information being conveyed through haptic stimulation.

Additionally or alternatively, the system and/or method can confer any other suitable benefits.

3. System 100

As shown in FIG. 1, a system 100 for haptic stimulation includes a haptic device 110 and preferably interfaces with and/or includes a virtual platform 120. Additionally or alternatively, the system 100 can include, define, and/or interface with any or all of: a processing subsystem, control module, communication subsystem, user device, and/or any other suitable component(s). Further additionally or alternatively, the system 100 can include any or all of the systems, component, embodiments, and/or examples described in any or all of: U.S. application Ser. No. 14/750,626, filed 25 Jun. 2015, U.S. application Ser. No. 15/661,934, filed 27 Jul. 2017, U.S. application Ser. No. 15/795,054, filed 26 Oct. 2017, and U.S. application Ser. No. 17/033,433, filed 25 Sep. 2020, each of which is incorporated herein in its entirety by this reference.

The system functions to apply haptic stimulation to a user based on virtual object information and/or any other suitable information associated with a virtual platform (e.g., virtual reality [VR] platform, augmented reality [AR] platform, etc.). The virtual object information and/or other information preferably includes visual information (e.g., as perceived by a user on a display, as perceived by a user with a VR/AR headset, etc.), but can additionally or alternatively include audio information, haptic information, conventionally non-perceivable information (e.g., echolocation, electromagnetic waves, ultrasound, non-visible light, etc.), olfactory information, and/or any other suitable information. The system further preferably functions to provide haptic stimulation through sensory displacement, wherein the haptic device is arranged at and provides stimulation to one or more first body regions (e.g., wrist(s), ankle(s), etc.), wherein the information conveyed through the haptic stimulation (e.g., visual information of a virtual object) is associated with one or more second body region(s) (e.g., hand(s), finger(s), leg(s), arm(s), etc.) separate and distinct from the first body region(s). This can confer numerous benefits (e.g., as described above), such as, but not limited to, any or all of: enabling the first body region(s) to maintain full and/or maximal mobility and/or dexterity; reduce a form factor/footprint of the haptic device; place the haptic device on a more convenient location and/or simpler anatomy; enable the device to be wireless; reduce a required surface area and/or complexity (e.g., number of haptic actuators, placement of haptic actuators, etc.) of the haptic device; enable haptic stimulation to be applied to a particularly, adequately, and/or maximally sensitive body region of the user (e.g., able to interpret and/or distinguish haptic stimulation); and/or can confer any other suitable benefits.

Additionally or alternatively, the system 100 can function to perform any or all of the processing involved in transforming the information into one or more haptic stimulation patterns, and/or updating any or all of the information (e.g., visual information provided to user at display) based on user inputs and/or motion.

Further additionally or alternatively, the system 100 can perform any other suitable function(s).

The system 100 is preferably utilized in the performance of the method 200, but can additionally or alternatively be used in association with any other suitable methods.

3.1 System: Haptic Device 110

The system includes a haptic device no, which functions to produce haptic stimulation with which to stimulate and/or convey information to a user. Additionally or alternatively, the haptic device 110 can function to The haptic device includes a set of haptic actuators 112, which individually and/or collectively function to apply haptic stimulation (equivalently referred to herein as a vibratory stimulation and/or tactile stimulation) to a user (e.g., at the first body region of the user). The haptic stimulation preferably functions to convey information to the user, but can additionally or alternatively function to enhance a user experience, provide entertainment to a user, and/or perform any other suitable function(s).

The set of actuators 112 can include one or more of: an actuator (e.g., linear resonant actuator [LRA], electroactive polymer [EAP] actuator, electromechanical polymer [EMP] actuator, etc.), a motor (e.g., brushless motor, brushed motor, direct current (DC) motor, alternating current (AC) motor, eccentric rotating mass (ERM), etc.), a piezoelectric device, and/or any other form of vibratory element. The set of actuators 112 preferably includes multiple actuators but can alternatively include a single actuator (e.g., a stationery actuator, a translatable actuator, etc.). In variations including multiple actuators, the actuators can be of the same type (e.g., all LRAs, all ERMs, etc.) or any combination of actuators (e.g., LRAs and ERMs). In a first variation of the haptic device 110, the set of actuators includes a set of multiple (e.g., 2, 4, 6, 8, 10, between 2 and 10, between 2 and 5, greater than 10, etc.) LRAs.

In haptic devices including multiple actuators, the actuators can be arranged in an array (e.g., 1-dimensional array, 2-dimensional array, 3-dimensional array, etc.), arranged at least partially circumferentially around a body part (e.g., around a wrist, around half of the circumference of the wrist, etc.), arranged along a body part (e.g., up and down an arm), arranged over a body region (e.g., over the user's trunk, stomach, etc.), arranged among different body parts of a user (e.g., arranged around both wrists), and/or arranged in any other suitable way. The vibratory elements can be directly coupled to the skin of a user (e.g., with an adhesive, with suction, etc.), separated from a user by a housing and/or fastener (e.g., a wristband), placed over a user's clothing, and/or coupled to the user in any other way. In variations of the system configured to apply haptic stimulation to a wrist of the user, the system preferably includes multiple actuators (e.g., 2, 3, 4, 5, 6, 7, 8, 9, 10, 15, 20, 25, 30, between 10 and 30, 30, between 30 and 40, 40, between 40 and 50, 50, greater than 50, etc.) arranged around at least a portion of the circumference (e.g., half the circumference) of the wrist. Additionally or alternatively, the system can include actuators circumscribing the entire wrist (e.g., 8 LRA actuators), and/or any other suitable number and arrangement of actuators. In a set of specific variations, the haptic device includes 5 actuators, wherein each of the actuators corresponds to a different finger/thumb of the user's hand. In specific examples, a haptic device is worn on each wrist of the user. Additionally or alternatively, the user can wear a single haptic device, use/wear haptic devices on other body regions, and/or interface at any number of haptic devices at any suitable locations/regions.

Figure 7:
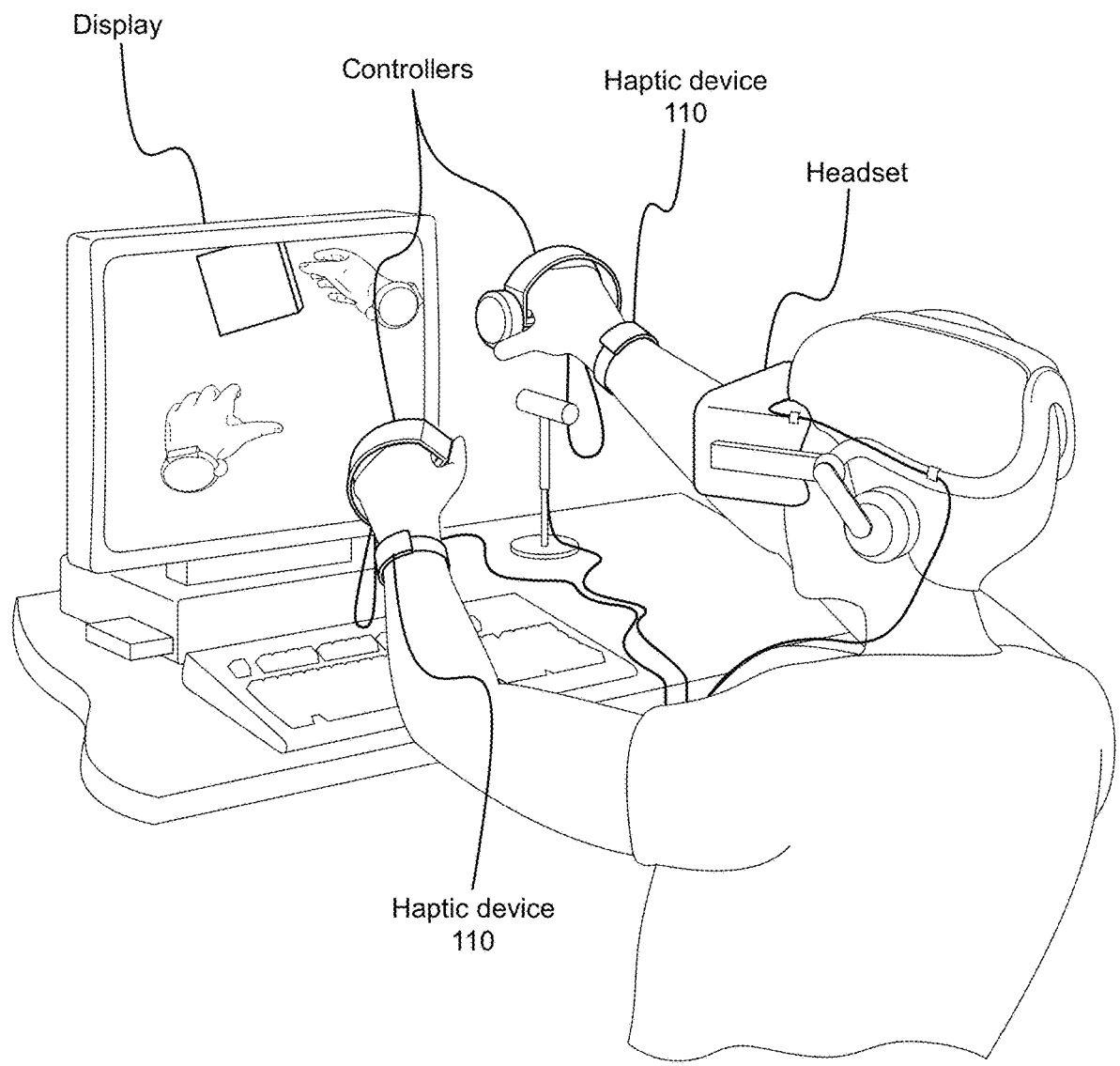
FIG. 7 depicts a user interacting with a virtual object in a virtual platform.

In a first set of variations, the body region(s) at which haptic stimulation is applied with haptic actuators of the haptic device includes one or both wrists (e.g., partial circumference of wrists, full circumference of wrists, etc.) of the user. Additionally or alternatively, haptic stimulation can be applied at any or all of: one or more hands of the user (e.g., in a glove form factor), one or more fingers of the user (e.g., in a glove form factor, in a ring form factor, etc.), one or more arms of the user (e.g., in a sleeve form factor, in an armband form factor, in a cast and/or sling form factor, etc.), one or more legs of the user (e.g., in a knee brace form factor, in a compression sleeve form factor, etc.), one or more feet of the user (e.g., in a shoe form factor, in a sock form factor, etc.), a torso of the user (e.g., in a vest form factor), a neck of the user (e.g., in a scarf form factor, in a neck wrap form factor, etc.), a head of the user (e.g., in a hat form factor, in a headband form factor, etc.), an ankle of the user (e.g., in an anklet form factor), and/or any other suitable body part(s) and/or body region(s) of the user. Additionally or alternatively, any or all of these body regions can be interpreted as having received haptic stimulation (e.g., through sensory displacement, through haptic illusions, etc.), visually depicted as interacting with one or more virtual objects in a virtual platform (e.g., as described below, as shown in FIG. 7, etc.), and/or any other body regions can interface with the haptic device 110 in any suitable way(s).

The haptic actuators are preferably individually and/or collectively configured to stimulate the user through one or more stimulation patterns (e.g., series of stimulation patterns), wherein a stimulation pattern refers to the prescribed haptic stimulation applied at one or more haptic actuators. Additionally or alternatively, any or all of the actuators can be configured to provide somatosensory stimulation via any one of a number of methods, such as, but not limited to: vibration, pressure, squeeze, electrotactile stimulation, and/or any other suitable stimulation.

The stimulation patterns can prescribe any or all of the following to the set of actuators (e.g., individually, collectively, etc.): amplitude of vibration, timing of vibration (e.g., when to start, duration, when to end, etc.), sequence of vibration, identification of which of the set of actuators to vibrate, frequency of vibration, pulsing of vibration (e.g., timing of pulse, total duration of pulse, temporal spacing between pulse, duration of each pulse, frequency of pulsing, etc.) and/or any other parameter(s) of stimulation. The haptic actuators can be configured to vibrate with any or all of these parameters fixed (e.g., fixed frequency, fixed amplitude, etc.), dynamic (e.g., dynamic frequency, dynamic amplitude, dynamic duration, dynamic pulsing pattern, etc.), and/or any combination.

Any or all of the actuators can be configured to vibrate at any suitable frequency or frequencies, such as any or all of: a fixed frequency (e.g., a single frequency); a range of frequencies (e.g., which can be adjusted and/or programmed according to the prescribed stimulation pattern, adjusted based on the vibration frequencies associated with the other actuators, etc.); and/or any other suitable frequency or combination of frequencies. In some variations, the stimulation pattern prescribes an amplitude of vibration and a duration of vibration to one or more actuators of the set of actuators, wherein each of the set of actuators is configured to vibrate at a fixed frequency. In specific examples, each of a set and/or a subset of multiple actuators is associated with a different fixed frequency, which can function to facilitate interpretation of information conveyed through the haptic actuators. Additionally or alternatively, the stimulation pattern can prescribe a frequency of vibration, a dynamic pattern of vibration (e.g., alternating between actuators), and/or any other suitable characteristic or parameter(s) of vibration.

In variations having multiple actuators (e.g., placed in a linear fashion along a wristband, arranged in an array on a vest, etc.), the system can optionally be configured to reduce coupling between actuators (e.g., between adjacent actuators). This can be at least partially accomplished by using actuators having different vibration frequencies (e.g., different single vibration frequencies, different programmed vibration frequencies, etc.) from each other, which can function to reduce mechanical coupling between actuators. In a first set of specific examples, the actuation subsystem includes a set of multiple actuations, wherein each actuator (e.g., LRA) is associated with a different prescribed frequency, such as a single prescribed frequency. This can function to increase the ease in which a user can interpret the location (e.g., at an actuator, in-between actuators for haptic illusions, etc.) and/or source of a haptic stimulus; help a user interpret information and/or increase the amount of identifiable information being conveyed through haptic stimulation (e.g., associating particular phonemes with particular frequencies, adding another variable with which to distinguish haptic stimulation, etc.); increase the degree to which signals dampen between adjacent actuators; and/or perform any other suitable function(s). Additionally or alternatively, each actuator can be configured to vibrate at multiple frequencies, but be programmed to vibrate at different frequencies (e.g., when multiple actuators are being actuated simultaneously, when applying a stimulation pattern, at all times, etc.). Further additionally or alternatively, the actuators can be configured to vibrate at any suitable frequency or frequencies.

Each of the actuators is preferably configured to be actuated with a variety of different amplitude values (e.g., according to a prescribed stimulation pattern), which can function to adjust the intensity with which information is provided to the user. This can in turn function to differentiate between different information, such as, but not limited to any or all of the following ways: providing higher intensity stimulation for greater values of a parameter (e.g., as described below); providing different intensities of stimulation for adjacent actuators; increasing a range of different haptic stimuli able to be applied to the user (e.g., by adding in an adjustable amplitude parameter); enabling haptic stimuli to be distinguished from each other; enhancing the ability of the system to provide entertainment to the user (e.g., through control of intensities to represent and/or enhance a musical performance, to match the beat of a song at a concert, etc.); enable important information to be easily detected (e.g., high amplitudes for more important and/or immediate information); to enable the provision of tactile illusion stimulation (e.g., by actuating multiple actuators in rapid succession); and/or can perform any other suitable function(s).

Additionally or alternatively, each of the actuators can be any or all of: actuated with a single and/or constant amplitude (e.g., each actuator actuates with the same amplitude, the actuators vibrate with different but fixed amplitudes, etc.); an amplitude of stimulation is determined in response to controlling a frequency of vibration (e.g., according to the spec of the particular actuators); and/or the actuators can be otherwise stimulated in accordance with any other suitable parameters.

The haptic device 110 can optionally include any number of fasteners and/or housings which can function to couple the haptic device to the user. These can include, for instance, but are not limited to, any or all of: one or more bands (e.g., wristband, arm band, leg band, ankle band, belt, etc.), garments (e.g., vests, clothing, hat, pants, socks, gloves, etc.), fabrics, attachment mechanisms (e.g., buckles, magnets, hook-and-loop closures, etc.), and/or any other suitable materials.

The haptic device 100 can additionally include and/or interface with any or all of: a power source and/or power storage (e.g., a battery), a haptic driver, processing systems (e.g., CPU, GPU, memory, etc.), user outputs (e.g., display, speaker, vibration mechanism, etc.), user inputs (e.g., a keyboard, touchscreen, microphone, etc.), a location system (e.g., a GPS system), sensors (e.g., optical sensors, such as light sensors and cameras, orientation sensors, such as accelerometers, gyroscopes, and altimeters, audio sensors, such as microphones, etc.), data communication system (e.g., a WiFi module, BLE, cellular module, etc.), and/or any other suitable components.

In preferred variations, the haptic device no is a wearable device, such as a wearable device coupled to the user with a fastener. Additionally or alternatively, the haptic device no can be otherwise coupled to the user, such as: placed against and/or placed on, held by (e.g., as a joystick and/or controller), wrapped around (e.g., as a scarf), resting upon, touching, secured to, arranged next to, arranged underneath (e.g., in a seat cushion), and/or otherwise coupled to the user.

In a first variation, the haptic device 110 includes a set of multiple actuators coupled to a wristband, the wristband configured to be worn around a wrist of the user, wherein the actuators are configured to apply haptic stimulation to the user's wrist based on information associated with a virtual object relative to a user's hand. In specific examples, the wristband includes 5 actuators (e.g., LRA actuators), wherein each actuator corresponds to a particular finger/thumb of the user. Additionally or alternatively, the wristband can include any number of actuators. Additionally or alternatively, in some specific examples, the user wears a wristband on each wrist.

In a second variation, the haptic device no includes an array of actuators coupled to a vest garment, wherein the haptic actuators can correspond to information associated with a virtual object relative to the user's torso. Additionally or alternatively, the information can be associated with any other suitable body regions of the user (e.g., through sensory displacement).

In a third variation, the haptic device includes an array of actuators integrated into one or more handheld controllers of a virtual platform.

Additionally or alternatively, the haptic device can include any other suitable components (e.g., processing subsystem, communication subsystem, etc.) and/or be otherwise configured.

3.2 System: Virtual Platform 120

Figure 8:
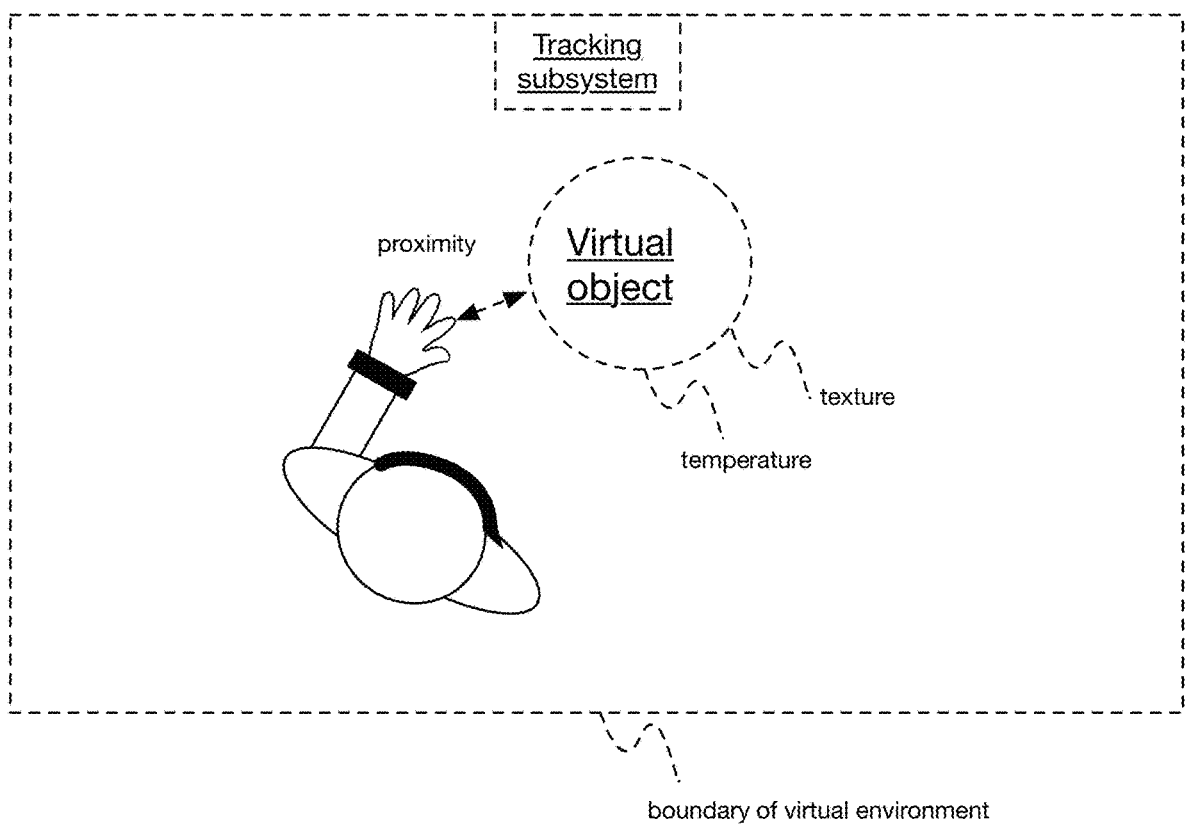
FIG. 8 depicts a schematic variation of a user interacting with a virtual object in a virtual platform.

The system preferably includes and/or interfaces with a virtual platform 120, which functions to provide and control virtual content (e.g., in VR, in AR, in mixed reality, in extended reality, etc.) including a set of virtual objects with which the user interacts during the method 200 (e.g., as shown in FIG. 8).

The virtual platform can be configured for any or all of: gaming, task performance (e.g., remote surgery, remote control of robotics, etc.), simulation (e.g., military simulators, flying simulators), training (e.g., surgical training), immersive teleconferencing, and/or any other suitable applications.

Virtual objects produced at the virtual platform herein refer to visual content/visual objects produced at the virtual platform which the user can perceive at a display of the virtual platform, such as a display in a VR headset, and/or any other suitable display. The virtual objects can represent any or all of: inanimate objects (e.g., ball, balloon, weapon, house, building, chair, etc.), animals, people (e.g., virtual representation of user, virtual representation of other users in a multi-user VR game, etc.), and/or any other objects portrayed in virtual applications.

The virtual platform preferably includes a tracking subsystem configured to determine and/or track a user's location (e.g., in a room or other predefined space, relative to a virtual object, etc.), further preferably a location of a particular region of the user's body (e.g., the second body region(s), the user's hands, the user's fingers, the user's torso, the user's head, the user's arm(s), the user's leg(s), the user's feet, etc.). The tracking system preferably implements one or more of the following types of tracking, but can additionally or alternatively implement any other suitable tracking: wireless tracking, optical tracking (e.g., with markers, without markers, etc.), inertial tracking, acoustic tracking, magnetic tracking, tracking with sensor fusion (e.g., merging inertial and optical tracking), and/or any other tracking or combination of tracking types. In preferred variations, for instance, the tracking subsystem is configured to track one or more of the user's fingers, but can additionally or alternatively be configured to track any suitable body regions.

The virtual platform can include any number of sensors configured to track the user, such as, but not limited to, any or all of: infrared sensors (e.g., infrared cameras), cameras of visible range, stereo cameras, depth cameras, accelerometers, gyroscopes, inertial measurement units (IMUs), and/or any other suitable sensors for tracking. Additionally or alternatively, any or all of the haptic device and/or sensors of the haptic device can be implemented in tracking. In some variations, for instance, the haptic device includes markers (e.g., IR markers) involved in tracking the haptic device, which can optionally be used to determine the location of a body region (e.g., proximal to the haptic device, at a predetermined and/or calculatable offset from the haptic device, etc.) of the user. Additionally or alternatively, any other sensors of the haptic device (e.g., onboard accelerometer, onboard motion sensor, onboard gyroscope, onboard IMU, etc.) can be used in tracking the haptic device. Further additionally or alternatively, any suitable components of the virtual platform (e.g., controllers, display devices, etc.) can be part of, involved with, and/or otherwise interface with the tracking subsystem. In some variations, for instance, the controllers include one or markers or sensors involved in tracking.

In some variations, tracking the user and/or one or more body regions of the user is performed with visible light and/or infrared light detection (e.g., with a wristband having infrared reflecting areas). In specific examples, a wristband is tracked. In additional or alternative specific examples, the user's hands and/or fingers are tracked.

Additionally or alternatively, tracking the user and/or body regions of the user can involve inertial measurement unit (IMU) sensor integration to determine an orientation of the device. In specific examples, this is combined with another tracking process to determine a location/position of the device.

Further additionally or alternatively, tracking the user and/or body regions of the user can involve using a VR and/or AR system's remote controller tracking and/or other device tracking (e.g., a hand-tracking glove used in combination with a wristband device as described above). In specific examples, for instance, if the system knows where and in what orientation the handheld controller and/or other device is, the location of the device (e.g., wristband) and/or body regions (e.g., fingers, hand, etc.) can be determined.

Further additionally or alternatively, acoustic tracking can be implemented, wherein the device (e.g., wristband) emits sounds (e.g., audible sounds, inaudible sounds, etc.) which are detected by a set of sensors (e.g., multiple audio sensors such as microphones), which enables a determination of the position and orientation of the device.

Further additionally or alternatively, a combination of any of the above (e.g., IMU sensor integration combined with another tracking process), and/or any other suitable tracking process can be used.

The virtual platform can additionally or alternatively include any other sensors (e.g., as described above for the haptic device) configured to detect other information, such as, but not limited to, any or all of: audio from the user, temperature, humidity, location (e.g., GPS coordinates), and/or any other suitable information.

The virtual platform can include any number of input devices configured to receive inputs from the user, such as one or more controllers (e.g., handheld controllers, wireless controllers, wired controllers, joysticks, etc.). In some variations, for instance, the virtual platform includes a pair of handheld controllers (e.g., as shown in FIG. 7) which the user uses during use of the virtual platform (e.g., to navigate and/or interact with the virtual environment). Additionally or alternatively, the virtual platform can include other suitable controllers, the controllers can be integrated with the haptic device, the virtual platform can be absent of controllers, and/or the virtual platform can be otherwise configured.

The virtual platform can include and/or interface with a display and/or display device, which functions to provide visual content including the virtual objects and/or any other form of content (e.g., audio) to the user. The display can be part of a headset, glasses (e.g., AR glasses), and/or be part of or include any other suitable display (e.g., screen) or display device.

In a first set of variations, the virtual platform includes a VR platform configured for gaming and/or any other suitable applications, wherein the VR platform includes a set of handheld controllers and a headset configured to enable a user to interact with a virtual environment including a set of virtual objects. In specific examples, the user wears a set of wristband haptic devices which provide haptic stimulation based on the user's interaction with the virtual objects (e.g., at the user's fingertips and translated into haptic stimulation at the wrist based on sensory displacement).

In a second set of variations, the virtual platform includes an AR platform configured to create and manage virtual objects which are integrated with real-world imagery.

Additionally or alternatively, the virtual platform can be otherwise configured and/or include any other components and/or combination of components.

3.3 System: Optional Components

The system can include and/or interface with a control module (e.g., onboard the haptic device, onboard the virtual platform, onboard a user device, remote from the haptic device and/or virtual platform, distributed among multiple devices and/or components and/or computing systems, etc.), which functions to apply stimulation through the haptic actuators at the haptic device. The control module can include a processing subsystem and/or computing subsystem (e.g., onboard the haptic device, distributed among multiple components and/or computing systems such as a remote computing system, etc.) wherein the processing subsystem and/or computing subsystem determines one or more stimulation patterns, stores one or more stimulation patterns, monitors system performance, implements a failsafe (e.g., power shut-off in the event of overheating or stimulation pattern parameter above a predetermined threshold, alarm, etc.), and/or performs any other suitable function. Determining a stimulation pattern can include any or all of: determining a new stimulation pattern (e.g., based on an algorithm, based on a machine learning model, etc.), selecting a stimulation pattern (e.g., from a lookup table, from a library, from a record of previously applied stimulation patterns, etc.), determining a set of parameters associated with a stimulation pattern (e.g., a set of weights for a stimulation pattern algorithm, an amplitude a stimulation, a frequency of stimulation, etc.), and/or any other suitable stimulation pattern and/or parameter(s) associated with a stimulation pattern. The control module is preferably in communication with a control module and/or computing subsystem (e.g., remote computing system, local computing system, etc.) of the virtual platform, wherein the control module receives information associated with the virtual object(s) (e.g., parameters as described below), wherein a processing subsystem and/or computing subsystem of the control module prescribes the stimulation pattern(s) in accordance with the virtual object information. Additionally or alternatively, the control module can determine the virtual object information and/or be otherwise configured and/or distributed.

In a first variation, the system 100 includes a control module at least partially arranged onboard the haptic device, wherein the control module determines and prescribes a stimulation pattern to be applied at any or all of the haptic actuators onboard the haptic device. The onboard control module is preferably in communication with a control module and/or computing subsystem of the virtual platform, such that the control module receives one or more inputs including information about the virtual objects to be represented through haptic stimulation. Additionally or alternatively, the control module can be partially or fully arranged remotely, partially or fully arranged at the virtual platform, distributed among multiple components, and/or otherwise arranged.

The system 100 can optionally include and/or be configured to interface with a user device and/or a client application executing on a user device. The client application can optionally enable a user to select one or more operational parameters of the system, perform information processing, serve as part of the virtual platform, receive sensor information, and/or otherwise be implemented. Examples of a user device include a tablet, smartphone, mobile phone, laptop, watch, wearable device (e.g., glasses), or any other suitable user device. The user device can include power storage (e.g., a battery), processing systems (e.g., CPU, GPU, memory, etc.), user outputs (e.g., display, speaker, vibration mechanism, etc.), user inputs (e.g., a keyboard, touchscreen, microphone, etc.), a location system (e.g., a GPS system), sensors (e.g., optical sensors, such as light sensors and cameras, orientation sensors, such as accelerometers, gyroscopes, and altimeters, audio sensors, such as microphones, etc.), data communication system (e.g., a WiFi module, BLE, cellular module, etc.), and/or any other suitable component(s).

Additionally or alternatively, the system 100 can include any or all of: a power source, a communication module (e.g., a wireless communication module, Wifi chip, Bluetooth chip, to establish communication between the haptic device and the virtual platform, etc.), and/or any other suitable components.

Figure 10:
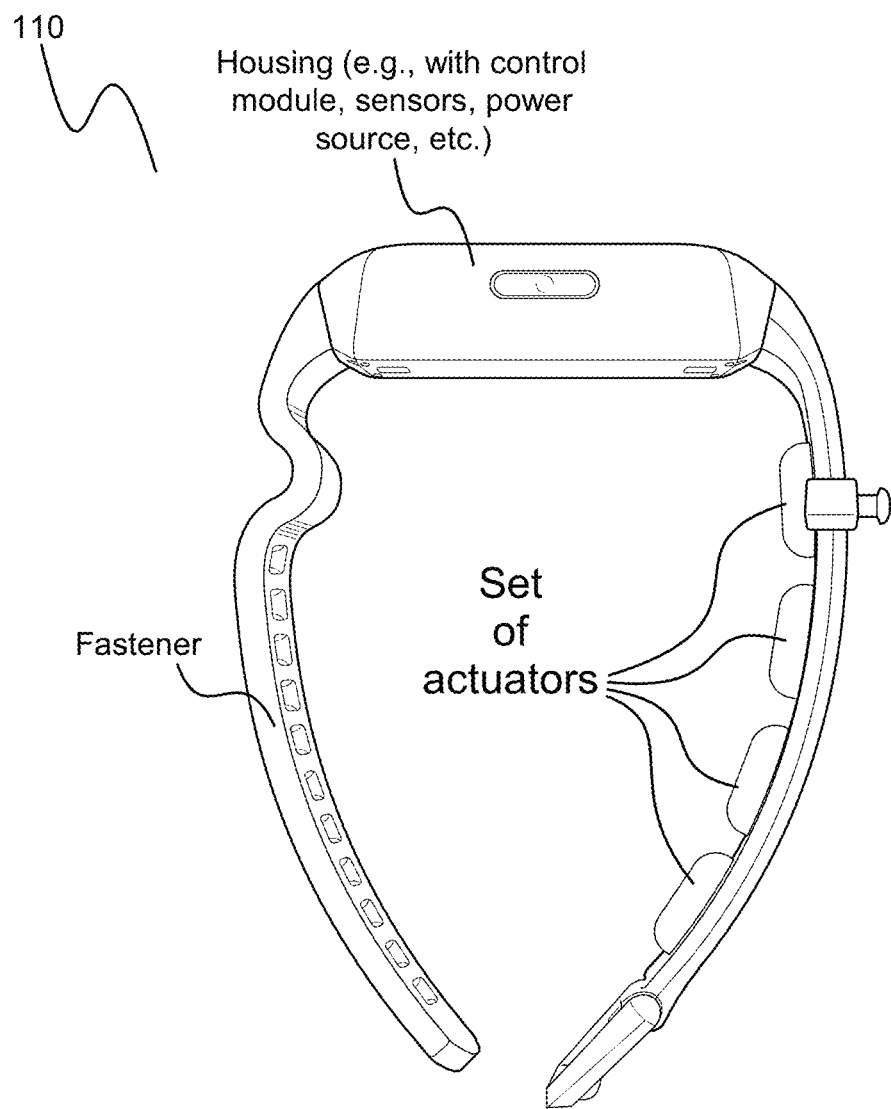
FIG. 10 depicts a variation of a haptic device.

In a first variation of the system 100, the system includes a haptic device configured to be worn on a wrist of the user, wherein the wristband device is configured to interface with a virtual platform, and includes a set of haptic actuators arranged around at least a partial circumference of the user's wrist, and optionally any other components onboard the wristband and/or in communication with the wristband, such as but not limited to, a control module, power source, sensors, markers for the tracking subsystem, and/or any other suitable components. In a preferred example, the wristband device includes 5 actuators (e.g., LRAs) with 1 representing each of the user's fingers. Additionally or alternatively, the wristband device can have less than 5 actuators (e.g., 4 actuators as shown in FIG. 10), more than 5 actuators (e.g., 10 actuators for all of the user's fingers, etc.), and/or any other suitable number of actuators. The user can optionally wear multiple wristband devices (e.g., 1 for each wrist, multiple going up the user's arm, etc.).

In a second variation, the haptic device includes a vest including an array of haptic actuators (e.g., in a uniform planar array, in a series of strips, etc.).

Additionally or alternatively, the system 100 can include any other suitable components.

4. Method 200

As shown in FIG. 2, a method 200 for haptic stimulation includes: receiving a set of inputs S210; determining one or more parameters associated with a virtual object based on the set of inputs S220; and prescribing a stimulation pattern to one or more haptic actuators of a haptic device S250. Additionally or alternatively, the method 200 can include any or all of: presenting information to a user S230; selecting one or more haptic actuators of a haptic device based on the parameter(s) S240; repeating any or all of S210-S2150; and/or any other suitable processes performed in any suitable order. Further additionally or alternatively, the method 200 can include any or all of the methods, processes, embodiments, and/or examples described in any or all of: U.S. application Ser. No. 14/750,626, filed 25 Jun. 2015, U.S. application Ser. No. 15/661,934, filed 27 Jul. 2017, U.S. application Ser. No. 15/795,054, filed 26 Oct. 2017, and U.S. application Ser. No. 17/033,433, filed 25 Sep. 2020, each of which is incorporated herein in its entirety by this reference.

The method 200 functions to convey information to a user through haptic stimulation, such as information associated with features of one or more virtual objects in a virtual platform. Additionally or alternatively, the method 200 can function to: provide haptic stimulation in accordance with sensory displacement, provide haptic stimulation in accordance with sensory addition, and/or provide haptic stimulation based on any other suitable information.

In a first set of variations, for instance, the method 200 functions to provide haptic stimulation which represents any or all of the following information associated with virtual objects in a virtual platform: a location and/or proximity of the virtual object relative to the user (e.g., in the user's visual field, behind the user and/or outside of the user's visual field, etc.); a degree of contact/force between the user (e.g., users' fingertips) and the virtual object (e.g., pressure/force exerted on a target virtual object, a pressure/force exerted by target virtual objects "on" the user, etc.); an orientation of a virtual object; a temperature of one or more virtual objects (e.g., indicating danger in a gaming application); one or more discrete states of a target virtual object (e.g., whether object is in contact with locations and/or desired locations, whether a threshold is reached, etc.); a texture and/or other surface information of a virtual object; and/or any other suitable information.

The method 200 is preferably performed at one or more computing systems, such as any or all of those described above (e.g., control module of the haptic device, computing system of the virtual platform, remote computing system, etc.). Additionally or alternatively, the method 200 can be performed at any location(s) with any suitable component(s) and/or system(s).

4.1 Method: Receiving a Set of Inputs S210

The method 200 includes receiving a set of inputs S210, which functions to receive information with which to determine the haptic stimulations patterns to be applied to the user. Additionally or alternatively, S210 can function to receive information with which to select which actuators and/or haptic device(s) to provide haptic stimulation from, and/or can perform any other suitable information.

S210 is preferably performed initially in the method 200, and further preferably performed continuously (e.g., at a predetermined frequency, at random intervals, etc.) throughout the method 200 as the user interacts with the virtual platform. Additionally or alternatively, S210 can be performed in response to a trigger and/or at any suitable time(s) during the method 200.

The set of inputs in S210 are preferably received from at least the virtual platform (e.g., a computing system involved in dynamically updating the virtual environment of the virtual platform, a controller, a headset, etc.), and optionally additionally or alternatively from the haptic device (e.g., a sensor system of the haptic device, a control module of the haptic device, a communication subsystem of the haptic device, etc.), a computing system (e.g., remote computing system, computing system of the haptic device, etc.), a user device, and/or from any other suitable components.

The set of inputs preferably includes information from the virtual platform, further preferably information associated with one or more virtual objects, which can be static, dynamic (e.g., moving, changing shape and/or size, changing state, etc.), and/or any combination. The one or more virtual objects can be prescribed (equivalently referred to herein as target) virtual objects (e.g., objects of importance in a gaming application, objects corresponding to characters in a game, surgical tool in a surgical simulation, anatomical region of interest in a surgical simulation, delicate anatomical region in a surgical simulation, etc.), dynamically determined virtual objects (e.g., based on user input, dynamically updated as the virtual environment changes, based on proximity to the user, etc.), all virtual objects, randomly-determined virtual objects, and/or any other suitable virtual objects.

The set of inputs preferably includes virtual object information from the virtual platform, further preferably spatial information associated with the virtual object.

The spatial information preferably includes a location (equivalently referred to herein as a position) of the virtual object (e.g., a vector position, a location in geographical coordinates, a location and/or position relative to a prescribed space, etc.), which can be used (e.g., in S220) to determine a distance parameter of the virtual object relative to the user. Additionally or alternatively, a distance parameter can be directly received and/or otherwise determined.

The spatial information can additionally or alternatively include orientation information (e.g., angle in degrees, angle in radians, multiple angles, etc.) associated with the virtual object, which can be used (e.g., in S220) to determine one or more angles of the virtual object relative to the user. Additionally or alternatively, an angle parameter can be directly received and/or otherwise determined.

The information associated with the virtual objects can additionally or alternatively include information associated with one or more features and/or parameters of virtual objects. The features can be predetermined (e.g., programmed, assigned, static, etc.), dynamically determined (e.g., prescribed and evolving as the virtual object moves and/or changes), determined based on other information (e.g., location of the virtual object, location of the user, proximity between the virtual object and the user, etc.), and/or any combination.

The features and/or parameters can optionally include, for instance, a force and/or pressure value associated with the virtual object and/or the user, such as a force and/or pressure (e.g., in Newton, in psi, in a normalized value, in a percentage, in a unitless value, etc.) exerted on a virtual object (e.g., by the user when he is in contact with the virtual object, by other virtual objects, based on information associated with the virtual object such as location and/or proximity to a virtual object or effect, etc.); a force and/or pressure exerted by the virtual object (e.g., on a particular location, on a location of the user(s), on a particular body region of the user, on a location of the haptic device, etc.); a force and/or pressure of a virtual effect (e.g., virtual rain, wind, etc.); and/or any other suitable information.

The features and/or parameters can additionally or alternatively include a texture associated with a virtual object (e.g., smooth surface, rough surface, regular texture, irregular texture, fibers, hair, fur, fluffy surface, etc.), which can be represented through a tactile stimulation pattern in subsequent processes of the method (e.g., when user is in contact with the virtual object).

The features and/or parameters can additionally or alternatively include a temperature associated with a virtual object, such as a temperature of a virtual object (e.g., in Fahrenheit, in Celsius, in a normalized value, in a unitless value, as a percentage of maximum temperature, in a qualitative representation of "cold" vs. "normal" vs. "hot", etc.). The temperature can optionally represent and/or be used to determine any or all of: a temperature of the virtual object relative to the virtual environment, a temperature of the virtual object relative to another virtual object, a temperature of the virtual object relative to a desired and/or predetermined temperature, and/or any other suitable temperature.

The features and/or parameters can additionally or alternatively include a discrete state associated with the virtual object, such as, but not limited to any or all of: whether a virtual object is a target object (e.g., object of interest, object most relevant to and/or closest to the user, etc.) or not, whether a virtual object is within or outside the field of view of the user, whether a virtual object's temperature is hot or cold (e.g., based on temperature information and a set of thresholds), and/or any suitable states.

The features and/or parameters can additionally or alternatively include one or more features not typically detectable and/or perceivable by a human, such as, but not limited to, echolocation (e.g., from a virtual bat), ultrasound, frequencies of sound outside of a detectable range, wavelengths of light outside of a visible range, electromagnetic waves, and/or any other suitable features representing any suitable phenomena.

The set of inputs received in S210 includes information associated with the user, further preferably information received from a tracking subsystem of a virtual platform. This can include, for instance, spatial information associated with the user, such as a location and/or orientation information of the user (e.g., as described above).

The tracking subsystem can collect information associated with the location and/or orientation of the haptic device (e.g., wristband haptic device with a set of markers, any haptic device with a set of markers, haptic device without markers, etc.); information associated with the location and/or orientation of the user himself (e.g., based on a visual tracking subsystem, for a user wearing markers, etc.); information associated with the location and/or orientation of a particular body region of the user (e.g., fingers and/or fingertips, hands, etc.); information associated with one or more components of the virtual platform such as location and/or orientation information of a headset and/or set of controllers; and/or any other suitable information.

In preferred variations, for instance, a tracking subsystem of the virtual platform collects location and orientation information associated with a haptic device (e.g., wristband device) coupled to the user. The haptic device can be directly tracked (e.g., with a set of markers on the haptic device, etc.); additionally or alternatively, a location and/or orientation of the wristband can be tracked by directly tracking a set of controllers held by the user in his hands (e.g., and based on a predetermined mapping from the controller position when held to the wristband). In specific examples involving a wristband haptic device, the tracking subsystem collects location and orientation information of the wristband.

The information associated with the user can additionally or alternatively include a set of inputs collected from the user, such as but not limited to: inputs received at one or more controllers of the virtual platform (e.g., button presses, movement of controllers, selections made at controllers, etc.); audio inputs received from user (e.g., voice commands); and/or any other suitable inputs.

In a first variation of S210, S210 includes collecting a vector location of a virtual object and one or more vector locations of the user (e.g., of the haptic device(s), of controller(s), etc.). S210 further preferably includes collecting an orientation associated with the user (e.g., angles of orientation of haptic device) and optionally an orientation associated with the virtual object. Additionally or alternatively, virtual object feature information, user inputs, and/or any other suitable information can be received.

4.2 Method: Determining One or More Parameters Associated with the Virtual Object Based on the Set of Inputs S220

The method 200 includes determining one or more parameters associated with the virtual object based on the set of inputs S220, which functions enable the determination and/or selection of a stimulation pattern to be applied to the user. Additionally or alternatively, S220 can function to determine which of a set of multiple features of a virtual object to represent in the stimulation pattern (e.g., by prioritizing a set of multiple parameters); characterize a relationship (e.g., in contact, not in contact, close to being in contact, etc.) between the user and a virtual object; determine one or more stimulation parameters (e.g., frequency value, amplitude, duration, pulsing parameters, etc.) in a stimulation pattern; and/or perform any other suitable function(s).

S220 is preferably performed in response to S210, wherein the parameters are determined from and/or equal to the information collected in S210. As such, S220 can optionally be performed continuously throughout the method 200 and/or at any suitable time(s) during the method 200. Additionally or alternatively, S220 can be performed prior to S210 and/or at any suitable time(s).

S220 preferably includes determining a proximity parameter between the user and a virtual object (e.g., target object), wherein the proximity parameter can include any or all of: a distance between the virtual object and one or more locations associated with and/or on the user (e.g., haptic device location, controller location, headset location, hand location, finger location, other body part location, averaged location, etc.); a discrete state of whether or not the user is in contact with the virtual object; an indication of whether the user is getting closer to or farther away from a virtual object; and/or any other proximity information.

The proximity parameter is preferably determined based on location information collected in S210, such as vector locations of the user and virtual objects. Additionally or alternatively, the proximity parameter can be determined based on orientation information (e.g., as described above) associated with the user and/or virtual object(s). Determining the proximity parameter (e.g., distance) can optionally include any number of mathematical (e.g., projecting position coordinates into a place, calculating a vector between position coordinates, etc.), algorithmic, and/or machine learning processes.

In preferred variations, for instance, S220 includes determining a distance between a region of interest (e.g., fingertips, hand, any region, etc.) of the user and a virtual object (e.g., target object), and optionally an orientation the user relative to the virtual object, which can subsequently be used to determine whether or not the region of interest is in contact with the virtual object. Additionally or alternatively, it can be determined if any part of the user is in contact with the virtual object, if a particular point representation of the user (e.g., center of mass, center of gravity, etc.) is in contact with a virtual object, if the haptic device and/or controller and/or headset is in contact with a virtual object, how many virtual objects the user is in contact with, and/or any other distances can be determined.

Determining the proximity parameter (e.g., distance) can include (e.g., in variations involving sensory displacement) determining one or more mappings S222 between system components (e.g., haptic devices, virtual platform components, etc.) and/or body regions of the user. This can function, for instance, to enable the location and/or other information associated with a body region of the user which is not directly tracked. In variations involving wristband haptic devices, for instance, S220 can include (e.g., when determining if a user is touching a virtual object with his or her fingers) determining a mapping from the location and/or orientation of the wristband device (e.g., which provides the location and/or orientation information in S210), such as in embodiments in which the wristband device is being tracked, to one or more fingers of the user's hand(s), such that parameters associated with the interaction of the user's fingers and a virtual object can be determined and used to determine a stimulation pattern. The mapping can be determined dynamically (e.g., based on supplementary information collected at a controller and/or haptic device and/or headset, based on supplementary information collected at one or more sensors, etc.), predetermined (e.g., based on predetermined distances between the user's body region and the haptic device placement, based on aggregated and/or average distances between a user's body region and the haptic device placement, based on an anatomical average distance between a human's fingertips and wrist, etc.), and/or otherwise determined. The mapping(s) can be specific to a particular user, aggregated for multiple users, and/or otherwise determined.

Additionally or alternatively the mapping can be between body regions (e.g., between fingers, between hands, between wrist and finger, etc.), between any suitable components and/or user body regions, and/or between any other locations.

S220 can additionally or alternatively include determining a proximity parameter (e.g., distance) of a virtual object to another virtual object, a proximity parameter of a user relative to a predetermined location, a proximity parameter of a virtual object relative to a predetermined location, and/or any other suitable proximity parameters.

The parameters can additionally or alternatively include any or all of the information described in S210, such as a texture parameter (e.g., length of fur, smooth vs. rough, etc.), a temperature value, a particular discrete state, and/or any other parameters.

In one variation of S220, S220 includes determining a set of proximity parameters between the fingers of a user and a virtual object, wherein the proximity parameter is determined based on location information and optionally orientation information associated with a wristband haptic device worn by the user. The proximity parameter for each finger includes a distance from the fingertip to the virtual object (e.g., nearest surface of the virtual object), and is determined based on a mapping from each of the fingertips of the wristband device (e.g., the points on the wristband device being tracked such as in a virtual platform using IR sensing). In specific examples, these distances are used to determine whether or not each of the fingertips is in contact with the virtual object. S220 can additionally include determining if there are parameters associated with features of the virtual object to be conveyed to the user (e.g., upon contact with the user), such as texture parameters (e.g., fur length).

In a second variation of S220, S220 includes determining a temperature parameter (e.g., temperature value) of a virtual object relative to the user, wherein the temperature parameter can optionally take into account a distance between the virtual object and the user (e.g., a hot temperature increases as the object gets closer to the user) and/or between the virtual object and another virtual object (e.g., as the virtual object gets closer to a virtual sun).

Additionally or alternatively, S220 can be performed in any other suitable way.

4.3 Method: Selecting One or More Haptic Actuators of the Haptic Device Based on the Parameter(s) S240

The method 200 preferably includes selecting one or more haptic actuators of the haptic device based on the parameter(s), which functions to prescribe the location(s) at which haptic stimulation is applied to the user. Additionally or alternatively, S240 can function to select a haptic device at which to apply stimulation (e.g., left wristband haptic device vs. right wristband haptic device) and/or can function to select any other component(s). Additionally or alternatively, in variations involving multiple haptic devices (e.g., distributed among multiple users, coupled to a single user, etc.) the method 200 can optionally function to select a subset of haptic devices at which to provide haptic stimulation. Further additionally or alternatively, the method 200 can include selecting a particular user and/or subset of users (e.g., such as in a virtual reality game involving multiple users) at which to apply haptic stimulation, and/or can include any other suitable processes and/or selection of haptic actuators.

S240 is preferably performed in response to S220 and based on the parameters and/or their values. Additionally or alternatively, S240 can be performed continuously and/or multiple times throughout the method, at other time(s), and/or at any time(s) during the method 200.

The haptic actuators and/or devices are preferably selected based on the parameters determined in S220, but can additionally or alternatively be predetermined (e.g., all actuate) and/or determined based on any suitable information.

Figure 5:
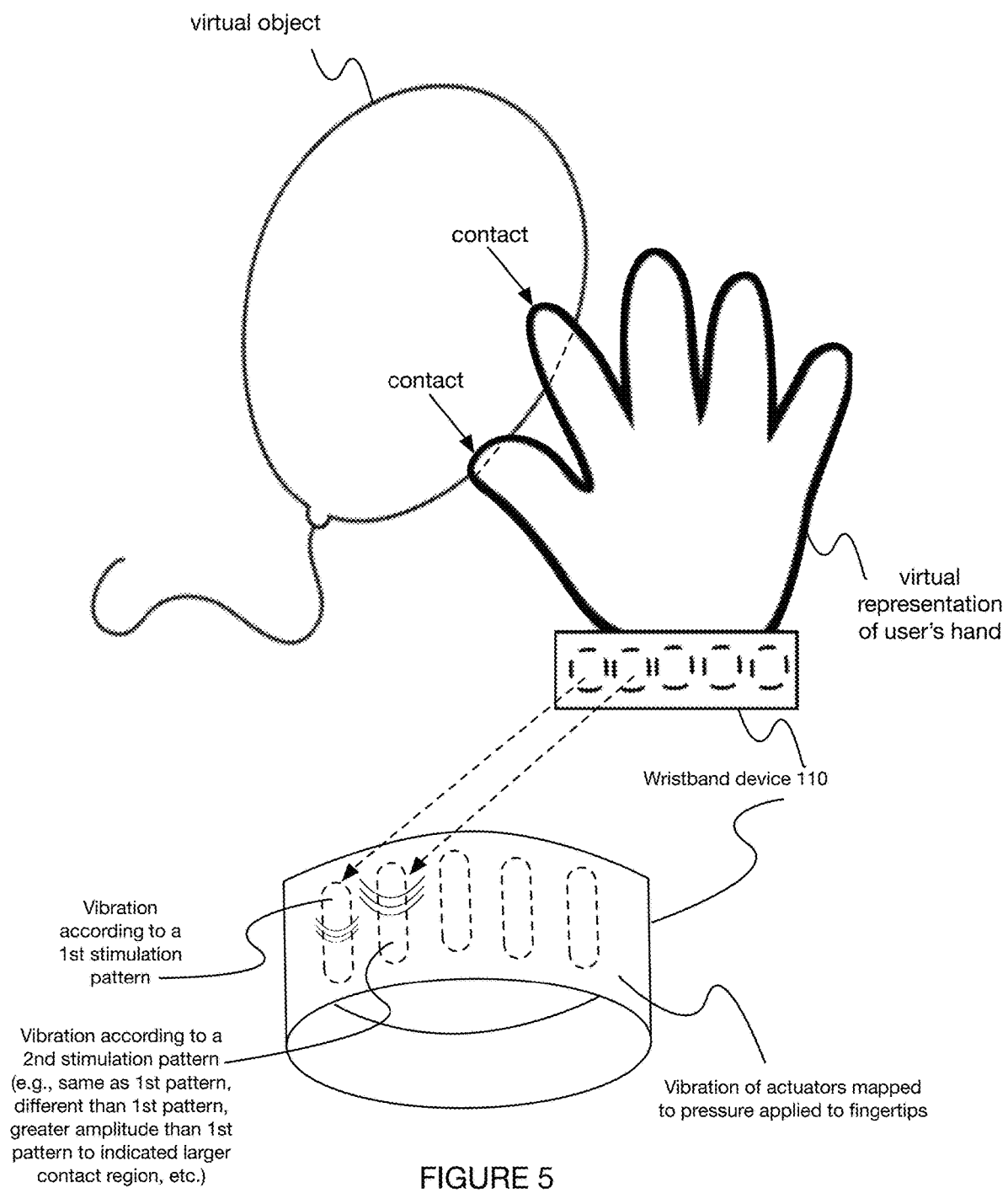
FIG. 5 depicts a variation of a user's hand making contact with a virtual object and the resulting haptic stimulation applied to a wristband device.
Figure 9A:
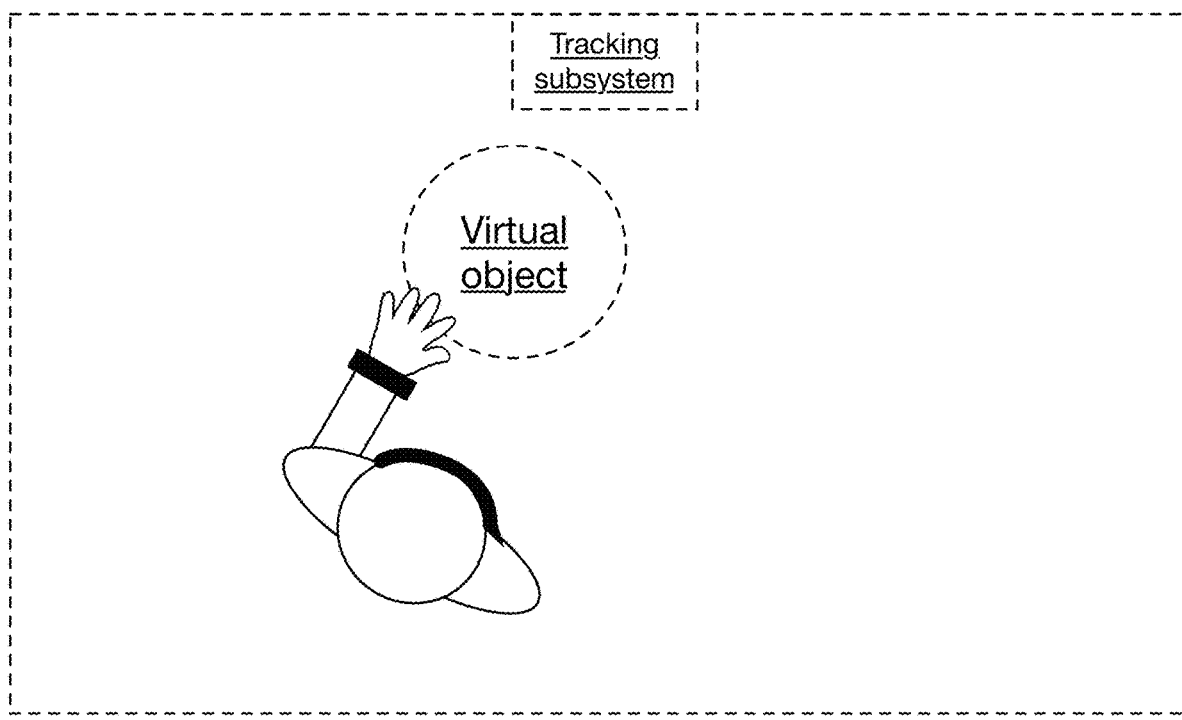
FIGS. 9A-9B depict a schematic variation of a user interacting with a virtual object in a virtual platform.
Figure 9B:
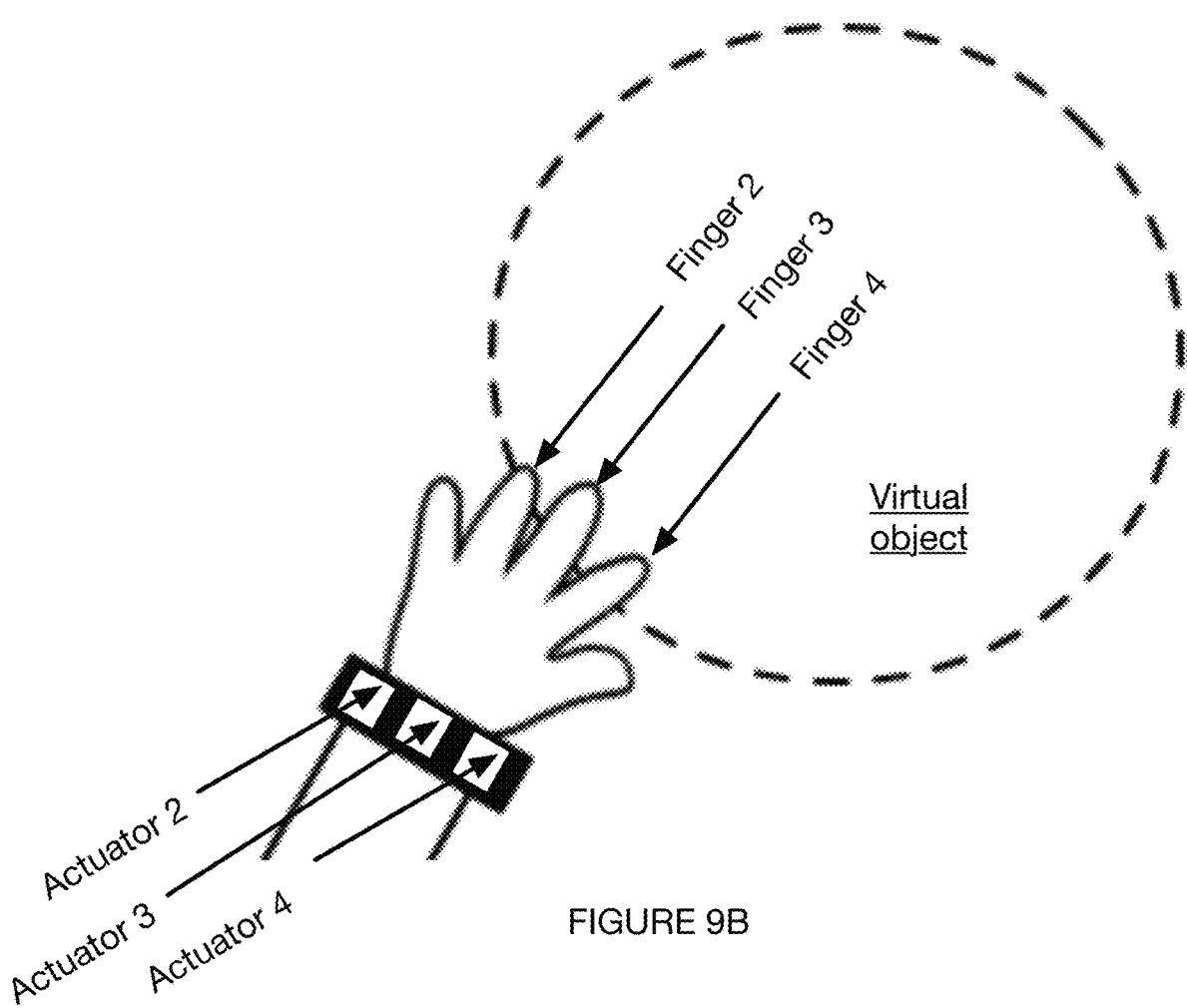

In a first set of variations (e.g., as shown in FIG. 5 and FIGS. 9A-9B), all actuators associated with a region determined to be in contact with a virtual object are actuated (e.g., with the same stimulation parameters, with different stimulation parameters, etc.).

In a second set of variations, all actuators having a parameter satisfying thresholds and/or criteria are actuated, such as all actuators: above a predetermined threshold (e.g., temperature above a temperature threshold, etc.), below a predetermined threshold (e.g., proximity threshold), associated with a particular discrete state, and/or any other suitable actuators.

In a third set of variations, only a single actuator and/or predetermined subset of actuators on a haptic device is actuated at a given time. This actuator/subset of actuators can be associated with a maximum value for a parameter, a minimum value for a parameter, and/or be otherwise chosen.

Additionally or alternatively, haptic actuators can be otherwise selected.

4.4 Method: Prescribing a Stimulation Pattern to the One or More Haptic Actuators S250

The method 200 includes prescribing a stimulation pattern to the one or more haptic actuators S250, which functions to represent information collected above in the form of haptic stimulation.

S250 is preferably performed in response to S240, but can additionally or alternatively be performed in response to S220, S210, continuously and/or multiple times throughout the method 200, and/or at any suitable time(s).

The stimulation pattern is preferably determined based on the value of the one or more parameters determined in S220, wherein the values of the parameter can be used to select one or more parameters of the stimulation (e.g., frequency, amplitude, duration, etc.). The stimulation parameters can be determined based on any or all of: predetermined assignments in a lookup table, dynamically determined assignments (e.g., based on algorithms, decision trees, machine learning models, etc.), a combination of parameters associated with the virtual object (e.g., temperature and texture and proximity), and/or any other suitable information.

One or more parameters of the stimulation pattern can optionally additionally or alternatively be determined, in part or in full, based on the type of parameter being represented by the haptic stimulation. Types of parameters can include, for instance, but are not limited to: proximity, pressure, force, temperature, texture, location (e.g., elevation), a discrete state (e.g., of the virtual object, of a feature of the virtual object such as color, etc.), any or all of the parameter types described above, and/or any other suitable parameter types. In some variations, for instance, the type of stimulation applied (e.g., pulsing vs. continuous, single pulse vs. double pulse, etc.) is determined based on the type of features (e.g., temperature vs. proximity vs. pressure, etc.) being represented.

S250 can optionally include comparing one or more parameters with a threshold and/or set of criteria in order to determine a stimulation pattern. This can include determining, for instance, any or all of: whether or not an object is currently in contact with a predetermined location (e.g., location of the user, location of another virtual object, etc.); whether a threshold is close to being met and/or has been met and/or exceeded (e.g., whether a pressure exerted by the user on a virtual object may cause the object to "break", whether a surgical tool and/or its virtual representation is within a predetermined distance threshold of a delicate region of a virtual representation of a patient's body, etc.); whether or not a discrete state applies to the virtual object or not; and/or any other thresholds and/or criteria can be implemented.

One or more parameters of the stimulation pattern can optionally be determined, for instance, based on the distance between the user and the virtual object, wherein the amplitude of stimulation provided at the haptic actuator increases as the virtual object gets closer. Additionally or alternatively, all haptic actuators associated with contact with the virtual object can vibrate with the same stimulation pattern.

In a first variation, for instance, the user wears a haptic wristband device on each of her wrists, wherein each wristband device includes an array of one or more haptic actuators (equivalently referred to herein as vibrational units) at positions around the circumference of the wrist. In one example embodiment (e.g., as shown in FIGS. 3A-3B, 4A-4B, and 5), a user wears two such wristbands each containing five vibrational linear resonant actuators spread around the user's wrists. In an example virtual environment, the user interacts with a virtual balloon, which has the ability to pop if a user exerts too much force upon it with the user's hands. In this embodiment, the target object is the virtual balloon, the actuators on the left wristband correspond the five fingertips of the user's left hand, and the actuators on the right hand to the five fingers of the user's right hand. In this example, each actuator vibrates in an inverse relationship between the distance of each corresponding fingertip of the user to the distance of the corresponding closest point on the balloon. As parts on the balloon get closer to each fingertip, the corresponding actuator vibrates more strongly. Upon making successful virtual contact between a fingertip and a point on the balloon, one or more actuators may vibrate with a particular pattern (e.g., particular pulsing pattern, particular duration, particular frequency, particular amplitude, etc.) to indicate that contact has been successfully made. Once the target object is in direct contact with the desired body locations—the user's fingers—the vibrational strength of each actuator may then be mapped to the pressure being exerted by the user on the balloon. The more pressure being exerted by a particular finger may be mapped to a stronger vibration. This information can also be used to interact with the object in various ways, such as, but not limited to any or all of: deforming it, scaling it, punching it, zooming in and out, displacing it, and/or otherwise altering the virtual object (e.g., as in S230). If a virtual threshold is exceeded (or about to be exceeded), one or more actuators can vibrate with a second particular pattern indicating a potential state change (e.g. balloon is about to or has popped) to the user.

In an alternative embodiment still involving wristband haptic devices, the actuators are mapped to five locations around the user's corresponding wrists (rather than mapped to the user's fingers). In this embodiment, the actuators in either wristband vibrate to the spatial orientation of the balloon relative to the user's wrists in an inverse relationship with distance. For example, if the balloon is located to the right of the user's right hand, the actuators representing the user's right side of the right wrist will vibrate the most strongly, while all other actuators will vibrate with a lesser amplitude and/or other parameter, or not at all. If the balloon is located between the user's hands, the actuators representing the inner wrists (closest to the balloon) will vibrate most strongly, while the actuators representing the outer wrists will vibrate less so (or not at all).

Additionally or alternatively, a haptic pattern (e.g., as described above and/or below, other than what is described above and/or below, etc.) can be applied to a user if an object is not grabbable (e.g., and the user tries to grab it). This haptic pattern is preferably different than those implemented for a grabbable object such that the user can identify that the object is not grabbable, but can additionally or alternatively include the same haptic patterns as those used otherwise.

In a second variation, the actuators may represent temperature rather than pressure, such that the stronger the vibration means a hotter or colder temperature for a virtual object that is in virtual contact with a user's fingertips.

In a third variation, the stimulation pattern can convey textures rather than strictly vibration amplitude or strength, which can be achieved via modulating electrical waveforms applied to the device. In this example, different sensations could be induced depending on the object that is in virtual contact with the user's fingertips. Fingertips being moved across a virtual balloon may provide a different stimulus than fingers being moved across a virtual stuffed animal.

Figure 4B:
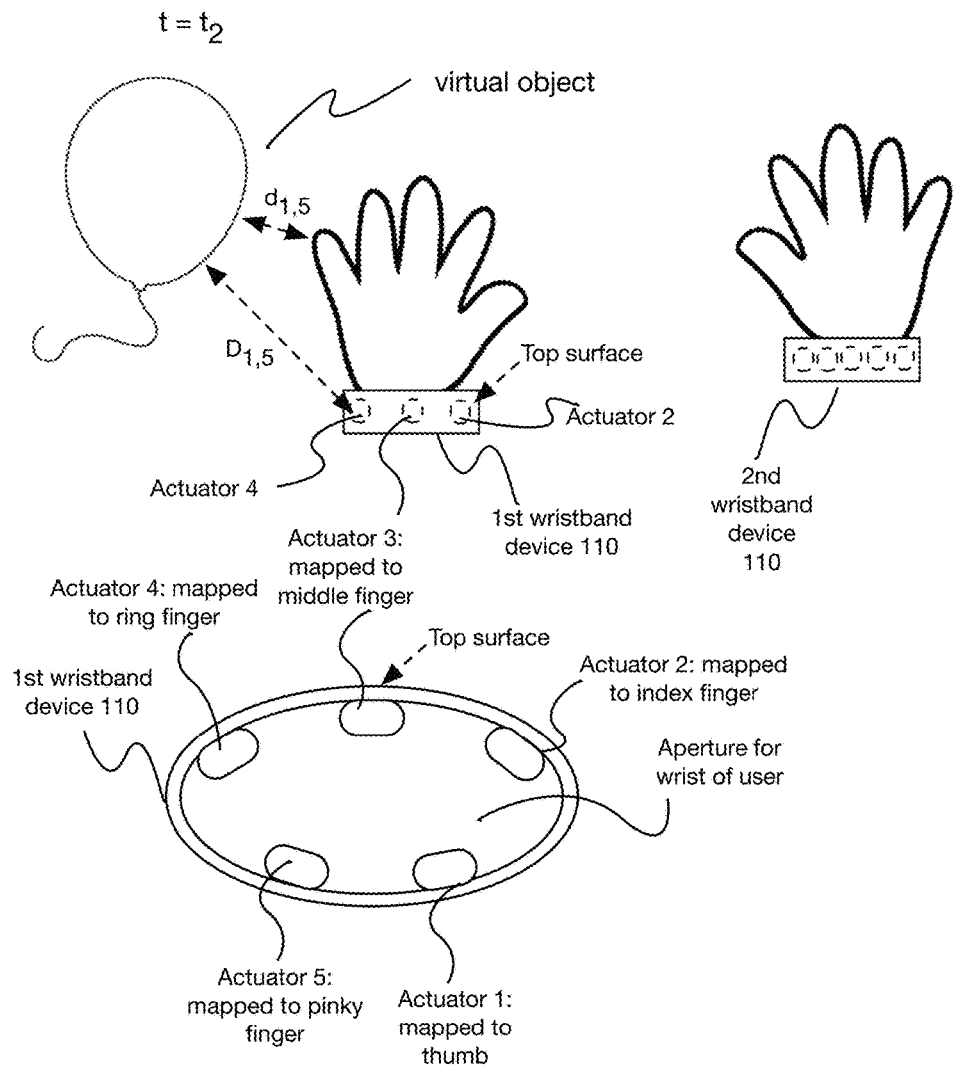

In a fourth variation (e.g., as shown in FIGS. 4A-4B), additional or alternative to those described above, haptic actuators in a haptic wristband vibrate around the wrist(s) of the user in the direction a virtual object is located, which is preferably implemented through one or more illusion algorithms—but can additionally or alternatively be implemented through any other suitable algorithm(s)—with the overall strength of the vibration representing (e.g., correlating to) distance.

In a fifth variation, additional or alternative to those described above, one or more haptic devices and/or haptic device actuators vibrates at a distinct or otherwise recognizable vibration when the virtual object is "grasped" by (virtually makes contact with) the user's hand.

In a sixth variation, additional or alternative to those described above, a wristband haptic device with 5 actuators, each representing a finger, is used as the haptic device. In specific examples, the strength of each actuator represents how far the finger is to the actuator, and a particular haptic pattern (e.g., for each finger, for all fingers, for a subset of fingers, etc.) can be implemented when the object is about within grasp, and a final pattern can be implemented when the object is actually grasped. From there, one could optionally switch to a mode where the vibration strength represents the force being exerted on the object by each finger.

Additionally or alternatively, S250 can be otherwise performed.

4.5 Method: Presenting Information to the User S230

The method 200 can optionally include presenting information to the user, which can function to provide feedback to the user. The information presented can include any or all of: visual feedback (e.g., presented at the virtual platform), audio feedback (e.g., beeping), tactile feedback (e.g., to indicate that the user needs to adjust one or more components, etc.).

S230 is preferably performed in response to S250 and/or S, wherein the information presented to the user includes visual feedback corresponding to the stimulation pattern, such as an indication of the amplitude of stimulation being applied. S230 can additionally or alternatively be performed continuously throughout the method 200 and/or at any other suitable time(s).

Additionally or alternatively, S230 can include portraying how the virtual object is manipulated (e.g., moved, squeezed, expanded, indented, pulled, etc.) based on the user's interaction with it.

In a first set of variations, S230 includes presenting a visual indicator at the virtual platform indicating any or all of: whether or not haptic stimulation is being applied, a feature of the haptic stimulation being applied (e.g., how much, how large of an amplitude, how high of a frequency, etc.), a location of where the haptic stimulation is being applied and/or what body region it corresponds to (e.g., which hand, which actuator, which finger, etc.), a change in the stimulation a value of a parameter determined in S220, and/or any other suitable information.

Figure 6A:
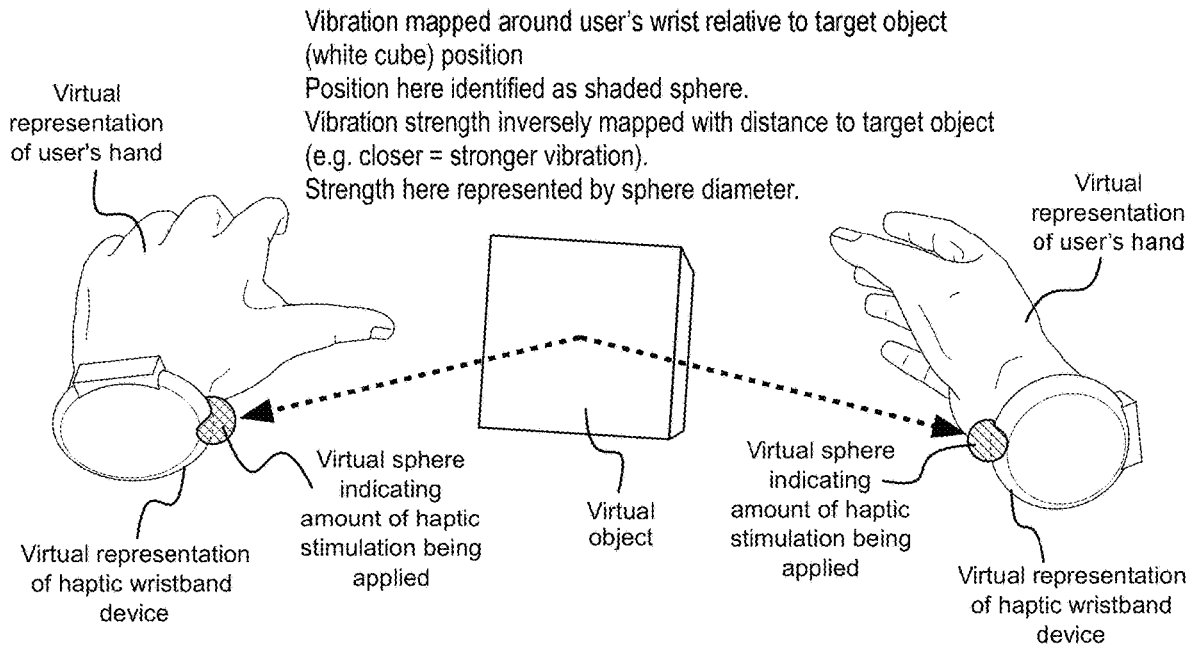
FIGS. 6A-6B depict a display of a virtual platform.
Figure 6B:
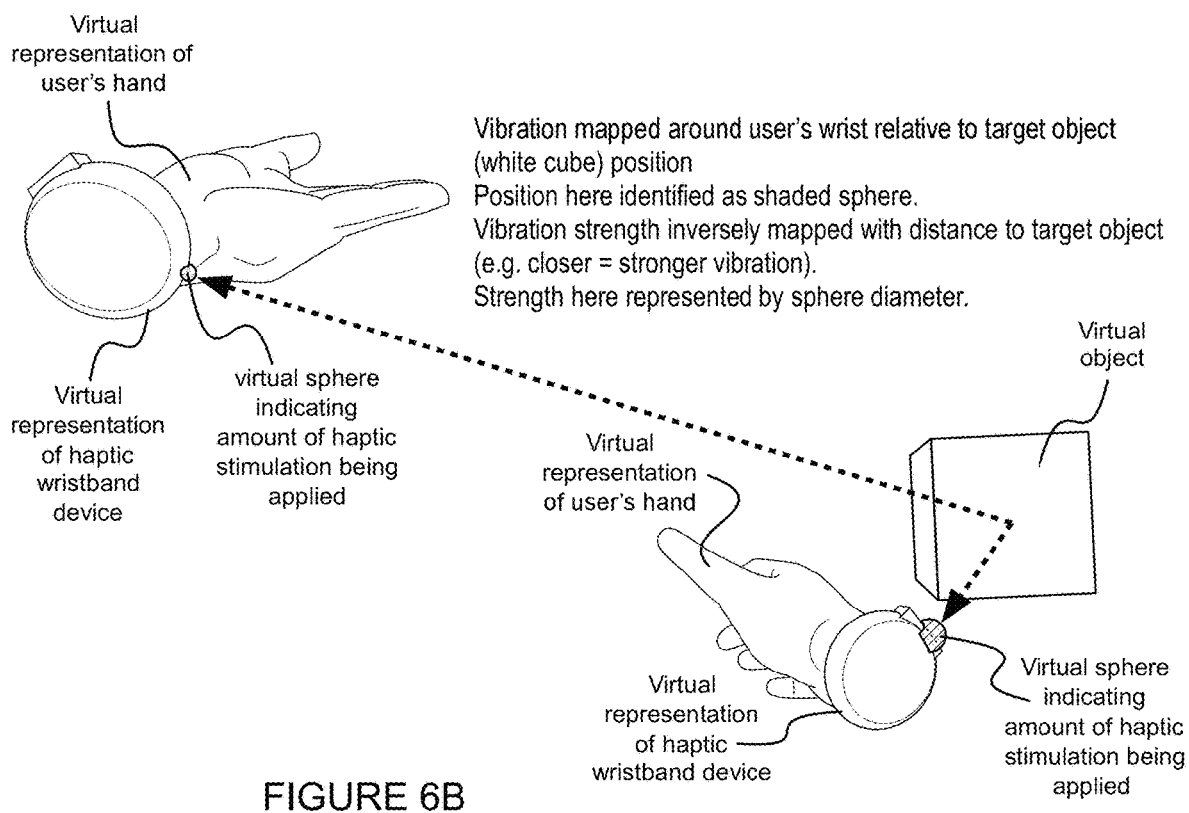

In a set of specific examples (e.g., as shown in FIGS. 6A-6B), an object (e.g., sphere) shows a stimulation amount, wherein a bigger sphere corresponds to a larger amplitude of stimulation.

4.6 Method: Repeating any or all of S210-S250

The method 200 can optionally include repeating any or all of the above processes, in any suitable order, such as throughout the duration of the user's use of the virtual platform. Additionally or alternatively, the processes of the method 200 can be otherwise performed.

5. Variations

In a first variation of the method 200, the method includes receiving a set of inputs S210, wherein the set of inputs includes inputs from a virtual platform associated with one or more virtual objects of the virtual platform (e.g., vector location of virtual object, features of virtual object, orientation of a virtual object, etc.) and inputs associated with a location of the user and/or an orientation of the user, and optionally one or more user inputs (e.g., at a controller of the virtual platform); determining one or more parameters associated with the virtual object based on the set of inputs S220, such as any or all of: one or more proximity parameters between the user and the virtual object (e.g., between the fingers of the user and the virtual object, between the haptic device and/or haptic actuators and the virtual object, etc.); a feature of the virtual object to be conveyed to the user (e.g., upon contact with the user), such as texture parameters (e.g., fur length) and/or temperature parameters; a discrete state of the virtual object; and/or any other suitable parameters; selecting one or more haptic actuators based on the parameter(s) S240; prescribing a stimulation pattern to the selected haptic actuators S250; optionally presenting information to the user S230 (e.g., based on the stimulation); optionally repeating any or all of the processes; and/or any other suitable processes performed in any suitable order.

In one embodiment of this variation as shown in FIGS. 9A-9B, a proximity parameter (e.g., distance) is determined between the user's fingertips and a virtual object, wherein if contact is made, stimulation is applied at the corresponding actuator. In a first example of this embodiment, Fingers 2, 3, and 4 are each determined to be in contact with the virtual object (e.g., have a distance parameter less than or equal to 0), which causes Actuators 2, 3, and 4 to all be actuated with the same stimulation pattern (e.g., same stimulation parameters). Actuators 1 and 5 (corresponding to pinky and thumb, respectively) on opposing side of wristband not actuated. In a second example of this embodiment, Fingers 2, 3, and 4 are each determined to be in contact with the virtual object (e.g., have a distance parameter less than or equal to 0) with Finger 3 closest (e.g., most overlapping), followed by Finger 4, followed by Finger 2. This results in Actuators 2, 3, and 4 all being actuated with different stimulation patterns (e.g., decreasing amplitude from Finger 3 to Finger 4 to Finger 2). Actuators 1 and 5 (corresponding to pinky and thumb, respectively) on opposing side of wristband not actuated. In a third example of this embodiment, Fingers 2, 3, and 4 each determined to be in contact with the virtual object (e.g., have a distance parameter less than or equal to 0) with Finger 3 closest (e.g., most overlapping), followed by Finger 4, followed by Finger 2, which causes Actuators 2, 3, and 4 to all be actuated with different stimulation patterns (e.g., decreasing amplitude from Finger 3 to Finger 4 to Finger 2). Actuators 1 and 5 (corresponding to pinky and thumb, respectively) on opposing side of wristband are also actuated (e.g., both with less amplitude than Actuator 2 and Actuator 5 with greater amplitude than Actuator 1; both with a stimulation pattern to indicate distance below a threshold but not touching, such as a different frequency; etc.). Additionally or alternatively, the actuators can be otherwise actuated.

In a second embodiment of this variation involving a proximity parameter, the distance between the wristband (and/or its haptic actuators) and the virtual object is used to determine haptic actuators to be activated and/or the corresponding stimulation pattern(s).

In a third embodiment of this variation, one or more features of the virtual object (e.g., temperature, texture, etc.) are used to determine the stimulation pattern and can be determined based on the proximity parameter (e.g., texture stimulated only when in contact, temperature increasing with decreasing distance, etc.), determined and/or stimulated independently of proximity, and/or otherwise used.

Additionally or alternatively, the method 200 can include any other suitable processes.

Although omitted for conciseness, the preferred embodiments include every combination and permutation of the various system components and the various method processes, wherein the method processes can be performed in any suitable order, sequentially or concurrently.

Embodiments of the system and/or method can include every combination and permutation of the various system components and the various method processes, wherein one or more instances of the method and/or processes described herein can be performed asynchronously (e.g., sequentially), contemporaneously (e.g., concurrently, in parallel, etc.), or in any other suitable order by and/or using one or more instances of the systems, elements, and/or entities described herein. Components and/or processes of the following system and/or method can be used with, in addition to, in lieu of, or otherwise integrated with all or a portion of the systems and/or methods disclosed in the applications mentioned above, each of which are incorporated in their entirety by this reference.

As a person skilled in the art will recognize from the previous detailed description and from the figures and claims, modifications and changes can be made to the preferred embodiments of the invention without departing from the scope of this invention defined in the following claims.

We claim:

1. A system for providing haptic information associated with a set of virtual objects in at least one of a virtual and augmented reality platform, the system comprising:
   a haptic stimulation device configured to be coupled to the user at a first body region, wherein the haptic stimulation device comprises:
      a set of multiple haptic actuators, each of the set of multiple haptic actuators configured to apply haptic stimulation to a skin surface of the user;
   a processing subsystem in communication with the at least one of a virtual and augmented reality platform, the processing system configured to determine a haptic stimulation pattern to be applied at the set of multiple haptic actuators, wherein the processing system:
      receives information associated with a first location, the first location corresponding to a location of a virtual object of the set of virtual objects;
      receives information associated with a second location, the second location corresponding to a location of a second body region of the user, the second body region separate and distinct from the first body region;
      determining a proximity metric based on the first location, the second location, and aggregated distances between the first body region and the second body region across a set of users;
      selecting an actuator from the set of multiple actuators based on the proximity metric; and
      actuating the actuator.

2. The system of claim 1, wherein the processing system is arranged at least partially onboard the haptic stimulation device.

3. The system of claim 1, further comprising a second haptic stimulation device configured to be coupled to the user.

4. The system of claim 3, wherein the second haptic stimulation device is configured to be coupled to the user at a third body region, the third body region separate and distinct from the first body region and the second body region.

5. The system of claim 4, wherein the first body region is a first wrist of the user and the third body region is a second wrist of the user.

6. The system of claim 1, wherein the first body region is a wrist of the user and the second body region is a hand of the user.

7. The system of claim 1, wherein the second body region of the user is a hand of the user, and wherein the selected actuator is assigned to a finger of the hand, wherein the finger is most proximal to the virtual object based on the proximity metric.

8. A method for providing haptic information associated with a set of virtual objects in at least one of a virtual and augmented reality platform to a user, the method comprising:
- at a processing subsystem in communication with the at least one of a virtual and augmented reality platform and a haptic device configured to be coupled to a first body region of the user, the haptic device comprising a set of multiple actuators:
  - receiving information associated with a first location, the first location corresponding to a location of a virtual object of the set of virtual objects;
  - receiving information associated with a second location, the second location corresponding to a location of a second body region of the user, the second body region separate and distinct from the first body region;
  - determining a proximity metric based on the first location, the second location, and a mapping from the first body region to the second body region, wherein the mapping is based on aggregated distances between the first body region and the second body region across a set of users;
  - selecting an actuator from the set of multiple actuators based on the proximity metric;
  - dynamically determining a stimulation pattern for the selected actuator based on the proximity metric and feature information associated with the virtual object; and
- at the haptic stimulation device, actuating the actuator with the stimulation pattern.

9. The method of claim 8, wherein the first body region and the second body region are non-overlapping.

10. The method of claim 8, further comprising: at the processing subsystem, determining the mapping.

11. The method of claim 10, wherein the mapping is dynamically determined based on a current configuration of the second body region.

12. The method of claim 8, wherein the mapping is predetermined.

13. The method of claim 8, wherein an intensity of the stimulation pattern is inversely correlated with a value of the proximity metric.

14. The method of claim 8, wherein the first body region is a wrist of the user and the second body region is a set of fingertips of a hand of the user.

15. The method of claim 8, further comprising receiving the feature information associated with the virtual object at the processing subsystem.

16. The method of claim 8, wherein the proximity metric is a distance.

17. The method of claim 8, wherein each of the remaining set of multiple actuators is associated with a proximity metric having a value greater than zero, wherein each of the remaining set of multiple actuators is not actuated.

18. The method of claim 8, wherein the feature information comprises a temperature of the virtual object.

19. The method of claim 8, wherein the feature information comprises a texture of the virtual object.

20. The method of claim 8, wherein the set of virtual objects are associated with an augmented reality platform.

21. The method of claim 8, further comprising determining an orientation associated with the second location based on the mapping from the first body region to the second body region, wherein the actuator is further selected based on a vector comprising the proximity metric and the orientation.

* * * * *